(12) United States Patent
Noh et al.

(10) Patent No.: US 12,463,753 B2
(45) Date of Patent: Nov. 4, 2025

(54) METHOD AND DEVICE FOR TRANSMITTING AND RECEIVING HARQ-ACK FEEDBACK IN WIRELESS COMMUNICATION SYSTEM

(71) Applicant: Samsung Electronics Co., Ltd., Gyeonggi-do (KR)

(72) Inventors: Hoondong Noh, Gyeonggi-do (KR); Heecheol Yang, Gyeonggi-do (KR); Youngwoo Kwak, Gyeonggi-do (KR); Jinhyun Park, Gyeonggi-do (KR)

(73) Assignee: Samsung Electronics Co., Ltd., Seoul (KR)

(*) Notice: Subject to any disclaimer, the term of this patent is extended or adjusted under 35 U.S.C. 154(b) by 0 days.

(21) Appl. No.: 18/623,408

(22) Filed: Apr. 1, 2024

(65) Prior Publication Data

US 2024/0250778 A1    Jul. 25, 2024

Related U.S. Application Data

(63) Continuation of application No. 17/297,825, filed as application No. PCT/KR2019/016236 on Nov. 25, 2019.

(30) Foreign Application Priority Data

Nov. 27, 2018  (KR) .................. 10-2018-0148968
Jan. 23, 2019  (KR) .................. 10-2019-0008932

(51) Int. Cl.
*H04L 1/1812*   (2023.01)
*H04L 1/1829*   (2023.01)
*H04W 72/23*    (2023.01)

(52) U.S. Cl.
CPC .......... *H04L 1/1812* (2013.01); *H04L 1/1861* (2013.01); *H04W 72/23* (2023.01)

(58) Field of Classification Search
CPC ... H04L 1/1812; H04L 1/1861; H04L 1/1614; H04L 1/1854; H04L 1/1896;
(Continued)

(56) References Cited

U.S. PATENT DOCUMENTS

| | | |
|---|---|---|
| 2015/0009931 A1 | 1/2015 | Yamazaki |
| 2017/0273056 A1 | 9/2017 | Papasakellariou |

(Continued)

FOREIGN PATENT DOCUMENTS

| | | |
|---|---|---|
| CN | 107852318 | 3/2018 |
| EP | 3 626 009 | 3/2020 |

(Continued)

OTHER PUBLICATIONS

Chinese Office Action dated Apr. 24, 2024 issued in counterpart application No. 201980078400.5, 18 pages.

(Continued)

*Primary Examiner* — Hoang-Chuong Q Vu
(74) *Attorney, Agent, or Firm* — The Farrell Law Firm, P.C.

(57) ABSTRACT

Provided is a method, performed by a terminal, for transmitting hybrid automatic repeat request-acknowledgement (HARQ-ACK) information in a wireless communication system, the method including: receiving a first physical downlink shared channel (PDSCH) from a first transmission and reception point (TRP) and receiving a second PDSCH from a second TRP; and transmitting at least one HARQ-ACK codebook including first HARQ-ACK bits for the first PDSCH and second HARQ-ACK bits for the second PDSCH, wherein the first PDSCH and the second PDSCH are joint-transmitted from the first TRP and the second TRP, based on different pieces of downlink control information (DCI).

16 Claims, 16 Drawing Sheets

(58) Field of Classification Search
CPC ... H04L 1/0003; H04L 1/0009; H04L 1/0031; H04L 5/0035; H04L 5/0055; H04L 27/2601; H04L 5/0053; H04L 1/0025; H04L 5/0007; H04L 5/0044; H04L 5/0098; H04L 27/2666; H04W 72/23; H04W 72/1263; H04B 7/024; H04B 7/0478

See application file for complete search history.

(56) References Cited

U.S. PATENT DOCUMENTS

| | | |
|---|---|---|
| 2018/0098345 A1 | 4/2018 | Tirola et al. |
| 2018/0132264 A1 | 5/2018 | Jung et al. |
| 2019/0261281 A1* | 8/2019 | Jung .................. H04W 52/346 |
| 2019/0261391 A1* | 8/2019 | Kundu ................. H04L 1/0073 |
| 2019/0342040 A1* | 11/2019 | Tiirola ................. H04L 5/0055 |
| 2020/0029325 A1 | 1/2020 | Hwang et al. |
| 2020/0036480 A1* | 1/2020 | Yang ..................... H04B 7/024 |
| 2020/0053766 A1* | 2/2020 | Chien .................. H04L 5/0053 |
| 2020/0092068 A1 | 3/2020 | Yang |
| 2020/0154447 A1 | 5/2020 | Lee et al. |
| 2020/0154467 A1 | 5/2020 | Gong |
| 2021/0014026 A1 | 1/2021 | Papasakellariou |
| 2021/0037551 A1 | 2/2021 | Khoshnevisan |
| 2021/0153185 A1* | 5/2021 | Schober ............... H04L 5/0051 |
| 2021/0329682 A1* | 10/2021 | Takeda ............. H04W 72/0446 |
| 2021/0352629 A1 | 11/2021 | Haghighat |
| 2021/0392673 A1* | 12/2021 | Miao .................... H04W 80/02 |
| 2022/0038918 A1* | 2/2022 | Ling .................... H04W 16/28 |
| 2022/0103330 A1* | 3/2022 | Li ......................... H04L 1/1671 |
| 2022/0140954 A1 | 5/2022 | Kim |
| 2022/0216955 A1 | 7/2022 | Kim |
| 2022/0256573 A1 | 8/2022 | Frenne |
| 2022/0369225 A1 | 11/2022 | Iyer |
| 2023/0164800 A1 | 5/2023 | Khoshnevisan |

FOREIGN PATENT DOCUMENTS

| | | |
|---|---|---|
| KR | 10-2018-0107048 | 10/2018 |
| WO | WO 2013/023290 | 2/2013 |
| WO | WO 2018/228487 | 12/2018 |

OTHER PUBLICATIONS

Korean Office Action dated Apr. 25, 2024 issued in counterpart application No. 10-2019-0008932, 4 pages.
Qualcomm Incorporated, "Enhancements on Multi-TRP/Panel Transmission", R1-1811277, 3GPP TSG-RAN WG1 Meeting #94bis, Oct. 8-12, 2018, 12 pages.
Qualcomm Incorporated, "Multi-TRP Enhancements", R1-1813442, 3GPP TSG-RAN WG1 Meeting #95, Nov. 12-16, 2018, 20 pages.
Catt, "Considerations on Multi-TRP/Panel Transmission for Rel-16", R1-1810555, 3GPP TSG RAN WG1 Meeting #94bis, Oct. 8-12, 2018, 10 pages.
International Search Report dated Mar. 5, 2020 issued in counterpart application No. PCT/KR2019/016236, 18 pages.
European Search Report dated Jul. 19, 2022 issued in counterpart application No. 19889952.8-1213, 10 pages.
Indian Examination Report dated Jan. 10, 2023 issued in counterpart application No. 202137028305, 7 pages.
Chinese Office Action dated Oct. 16, 2023 issued in counterpart application No. 201980078400.5, 20 pages.
Huawei, HiSilicon, "Motivation for NR Multi-TRP and MIMO Enhancements", RP-180892, 3GPP TSG RAN Meeting #80, Jun. 11-14, 2018, 5 pages.
Vivo, "Layer 1 Enhancements for URLLC", R1-1810395, 3GPP TSG RAN WG1 Meeting #94bis, Oct. 8-12, 2018, 12 pages.
Korean Office Action dated Dec. 23, 2024 issued in counterpart application No. 10-2019-0008932, 9 pages.
CN Rejection Decision dated Sep. 10, 2024 issued in counterpart application No. 201980078400.5, 18 pages.
EP Communication Report dated Aug. 29, 2024 issued in counterpart application No. 19889952.8-1206, 5 pages.
Korean Office Action dated Aug. 19, 2025 issued in counterpart application No. 10-2019-0008932, 4 pages.

* cited by examiner

METHOD AND DEVICE FOR TRANSMITTING AND RECEIVING HARQ-ACK FEEDBACK IN WIRELESS COMMUNICATION SYSTEM

PRIORITY

This application is a continuation of U.S. application Ser. No. 17/297,825, which was filed in the U.S. Patent and Trademark Office on May 27, 2021, which is a National Phase Entry of PCT International Application No. PCT/KR2019/016236, which was filed on Nov. 25, 2019, and claims priority to Korean Patent Application Nos. 10-2018-0148968 and 10-2019-0008932, which were filed on Nov. 27, 2018 and Jan. 23, 2019, respectively, the entire content of each of which is incorporated herein by reference.

TECHNICAL FIELD

The present disclosure relates to a wireless communication system, and more particularly, to a method and apparatus for configuring a codebook for terminal hybrid automatic repeat request-acknowledgement (HARQ-ACK) feedback.

BACKGROUND ART

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post long-term evolution (LTE) systems.' In order to achieve a high data rate, 5G communication systems are being developed to be implemented in an ultra-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (COMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of cloud radio access network (RAN) as a big data processing technology described above may be an example of convergence of 5G communication technology and IoT technology.

As described above, various services may be provided due to the development of wireless communication systems, and thus, methods of seamlessly providing such services are required.

DESCRIPTION OF EMBODIMENTS

Technical Problem

Embodiments may provide a method and apparatus for configuring a codebook for hybrid automatic repeat request-acknowledgement (HARQ-ACK) feedback of a terminal in a wireless communication system.

Solution to Problem

The present disclosure relates to a method and apparatus for transmitting and receiving hybrid automatic repeat request-acknowledgement (HARQ-ACK) feedback in a wireless communication system, and a method, performed by a terminal, for transmitting HARQ-ACK information in a wireless communication system, includes: receiving a first physical downlink shared channel (PDSCH) from a first transmission and reception point (TRP) and receiving a second PDSCH from a second TRP; and transmitting at least one HARQ-ACK codebook including first HARQ-ACK bits for the first PDSCH and second HARQ-ACK bits for the second PDSCH, wherein the first PDSCH and the second PDSCH are joint-transmitted from the first TRP and the second TRP, based on different pieces of downlink control information (DCI).

Advantageous Effects of Disclosure

According to the present disclosure, a hybrid automatic request-acknowledgement (HARQ-ACK) codebook may be efficiently configured, transmitted, and received in a wireless communication system.

MODE OF DISCLOSURE

Figure 1:
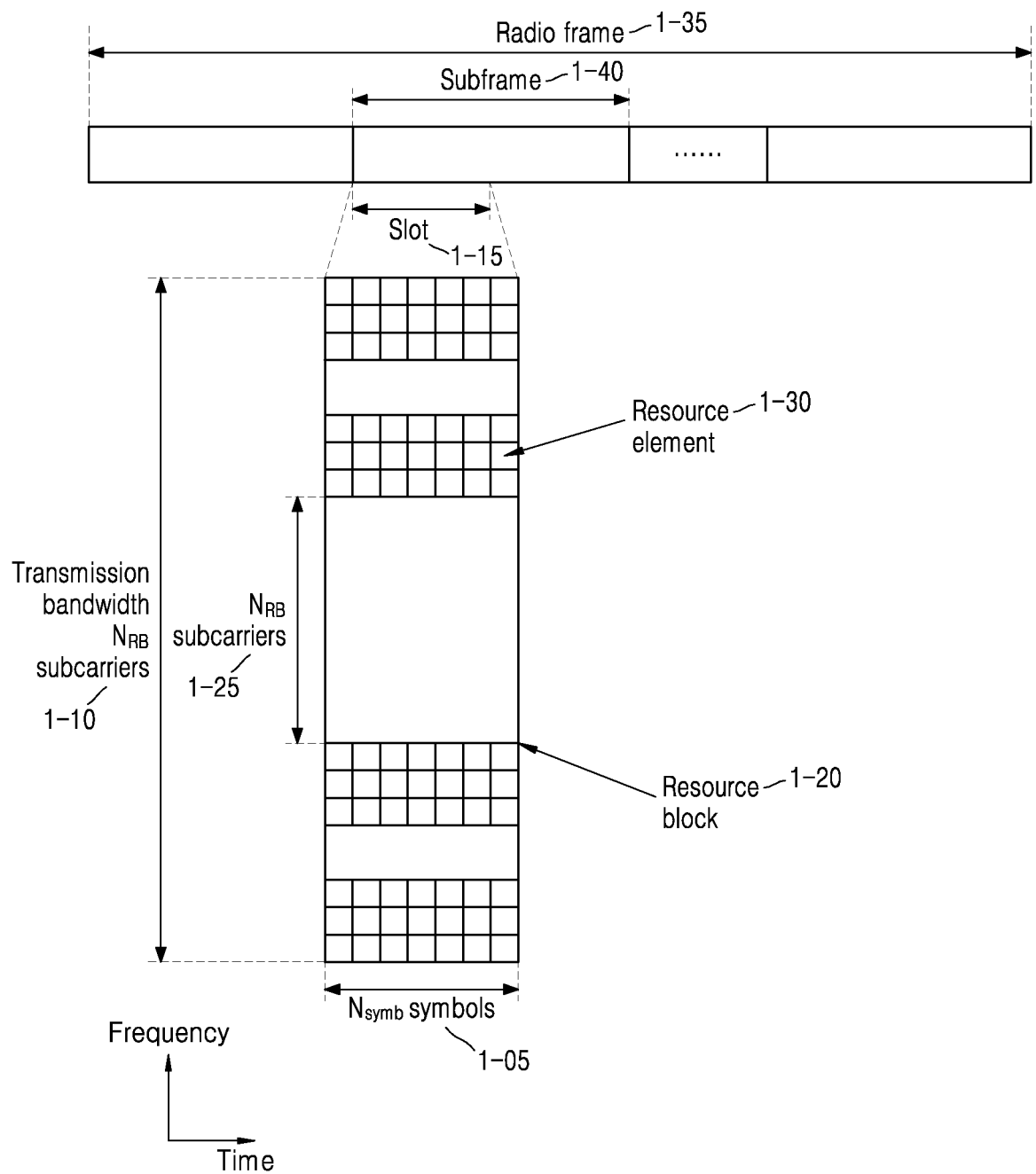
FIG. 1 is a diagram showing a time-frequency domain transmission structure of a long-term evolution (LTE) system, an LTE-advanced (LTE-A) system, a new radio (NR) system, or a wireless communication system similar thereto.

Hereinafter, embodiments of the present disclosure will be described with reference to accompanying drawings.

In describing the embodiments, descriptions of technical contents that are well known in the technical field to which the present disclosure belongs and are not directly related to the present disclosure will be omitted. By omitting the unnecessary description, the gist of the present disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the present disclosure and methods of accomplishing the same may be understood more readily by reference to the following detailed description of the embodiments and the accompanying drawings. In this regard, the embodiments of the present disclosure may have different forms and should not be construed as being limited to the descriptions set forth herein. Rather, these embodiments of the present disclosure are provided so that the present disclosure will be thorough and complete and will fully convey the concept of the present disclosure to one of ordinary skill in the art, and the present disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, according to some embodiments, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in some embodiments, the "unit" may include at least one processor.

Hereinafter, operation principles of the present disclosure will be described with reference to accompanying drawings. While describing the present disclosure, detailed description of related well-known functions or configurations may be omitted when it is deemed that they may unnecessarily obscure the essence of the present disclosure. Also, terms used below are defined in consideration of functions in the present disclosure, and may have different meanings according to an intention of a user or operator, customs, or the like. Thus, the terms should be defined based on the description throughout the specification. Hereinafter, a base station is an entity that assigns resources of a terminal, and may be at least one of a next generation node B (gNB), an evolved node B (eNB), a node B (NB), a base station (BS), a wireless access unit, a base station controller, or a node on a network. Examples of a terminal may include user equipment (UE), a mobile station (MS), a cellular phone, a smartphone, a computer, and a multimedia system capable of performing a communication function. However, the present disclosure is not limited to the above examples.

Hereinafter, a technique for a terminal to receive broadcast information from a base station in a wireless communication system will be described. The present disclosure relates to a communication technique and system in which a $5^{th}$ generation (5G) communication system for supporting a higher data rate than a beyond $4^{th}$ generation (4G) communication system is converted to an Internet of things (IoT) technology. The disclosure may be applied to intelligent services (e.g., smart homes, smart buildings, smart cities, smart cars or connected cars, health care, digital education, retail business, and security and safety related services) based on 5G communication technology and IoT related technology.

Hereinbelow, terms indicating broadcast information, terms indicating control information, terms related to communication coverage, terms indicating a change in a state (for example, an event), terms indicating network entities, terms indicating messages, and terms indicating components of an apparatus are exemplified for convenience of description. Thus, the terms used in the present disclosure are not limited and other terms having the same technical meanings may be used.

Hereinafter, for convenience of description, some of terms and names defined by the 3rd Generation Partnership Project Long Term Evolution (3GPP LTE) standard may be used. However, the present disclosure is not limited by such terms and names, and may be equally applied to systems conforming to other standards.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a user equipment (UE) or a mobile station (MS)) transmits data or a control signal to a base station (BS) (e.g., eNode B), and the DL refers to a radio link through which a BS transmits data or a control signal to a terminal. The multiple access scheme as described above normally allocates and operates time-frequency resources for carrying data or control information of different users to prevent the time-frequency resources from overlapping with each other, that is, establish orthogonality therebetween, thereby identifying the data or the control information of each user.

As a future communication system after the LTE system, that is, a 5G communication system, has to be able to freely reflect various requirements of a user and a service provider, and thus, services satisfying various requirements need to be supported. The services considered for the 5G communication system include enhanced mobile broadband (eMBB), massive machine type communication (mMTC), ultra reliability low latency communication (hereinafter, URLLC), etc.

According to some embodiments, the eMBB aims to provide a higher data rate than a data rate supported by the LTE, LTE-A, or LTE-Pro system. For example, in the 5G communication system, the eMBB should be able to provide a peak data rate of 20 Gbps in the DL and a peak data rate of 10 Gbps in the UL from the viewpoint of one BS. At the same time, the eMBB should provide an increased user perceived data rate. In order to satisfy such requirements, improvement of various transmitting/receiving technologies including a further improved multiple-input and multiple-output (MIMO) transmission technology may be demanded. Also, the eMBB may satisfy a data rate required in the 5G communication system by using a frequency bandwidth wider than 20 MHz in a frequency band of 3 to 6 GHz or equal to or greater than 6 GHz instead of 2 GHz used by current LTE.

At the same time, the mMTC is being considered to support application services such as IoT in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and various devices to provide communication functions. In addition, the terminals supporting the mMTC are more likely to be positioned in shaded areas not covered by a cell, such as the underground of a building due to nature of services, and thus, the terminal may require a wider coverage than other services provided by the 5G communication system. The terminals that support the mMTC should be configured as inexpensive terminals and require very long battery lifetime because it is difficult to frequently replace batteries of the terminals.

Finally, the URLLC that is a cellular-based wireless communication service used for mission-critical purposes needs to provide communication providing ultra-low latency and ultra-high reliability as a service used in remote control for robots or machinery, industrial automation, unmanaged aerial vehicles, remote health care, or emergency alert. For example, a service supporting the URLLC should satisfy air interface latency smaller than 0.5 milliseconds and at the same time, has a packet error rate of 10.5 or less. Accordingly, for the service supporting the URLLC, the 5G communication system is required to provide a transmit time interval (TTI) shorter than those for other services while allocating a broad resource in a frequency band. However, the mMTC, URLLC, and eMBB are examples of different service types, and service types to which the disclosure is applied are not limited thereto.

The services considered in the 5G communication system described above may be converted with each other and provided based on one framework. In other words, for efficient resource management and control, services may be integrated, controlled, and transmitted via one system instead of being independently operated.

Also, hereinbelow, one or more embodiments of the disclosure will be described as an example of an LTE, LTE-A, LTE Pro, or new radio (NR) system, but the one or more embodiments of the disclosure may also be applied to other communication systems having a similar technical background or channel form. Also, it will be understood by one of ordinary skill in the art that embodiments of the present disclosure may be applied to other communication systems through some modifications without departing from the scope of the present disclosure. Hereinafter, frame structures of LTE, LTE-A, and 5G communication systems will be described with reference to accompanying drawings, and a design direction of the 5G communication system will be described.

FIG. 1 is a diagram showing a time-frequency domain transmission structure of an LTE system, an LTE-A system, an NR system, or a wireless communication system similar thereto.

FIG. 1 illustrates a basic structure of a time-frequency resource domain that is a radio resource domain where data or a control channel of the LTE, LTE-A, and NR system based on cyclic prefix-orthogonal frequency division multiplexing (CP-OFDM) or single carrier-frequency division multiple access (SC-FDMA) waveform is transmitted.

In FIG. 1, a horizontal axis represents a time domain and a vertical axis represents a frequency domain. UL may denote a wireless link where a terminal transmits data or control signal to a base station, and DL may denote a wireless link where a base station transmits data or control signal to a terminal.

A smallest transmission unit in a time domain of the LTE, LTE-A, and 5G system is an OFDM symbol or SC-FDMA symbol, and $N_{symb}$ symbols 1-05 may gather to configure one slot 1-15. In the LTE and LTE-A system, two slots each including $N_{symb}=7$ symbols may configure one subframe 1-40. According to some embodiments, in the 5G system, a slot and a mini-slot (or non-slot) may support two types of slot structure. In a 5G slot, $N_{symb}$ may have a one value among 7 or 14, and in a 5G mini-slot, $N_{symb}$ may be set to one value among 1, 2, 3, 4, 5, 6, or 7. In the LTE and LTE-A system, a length of the slot is fixed to 0.5 ms and a length of the subframe is fixed to 1.0 ms, but in the 5G system, the length of slot or mini-slot may flexibly vary depending on a subcarrier spacing. In the LTE and LTE-A system, a radio frame 1-35 is a time domain unit including 10 subframes. In the LTE and LTE-A system, a smallest transmission unit in the frequency domain is a subcarrier of a 15 kHz unit (subcarrier spacing=15 kHz), and a bandwidth of an entire system transmission bandwidth includes total $N_{BW}$ (1-10) subcarriers. A flexible expandable frame structure of the 5G system will be described below.

In a time-frequency domain, a base unit of a resource is a resource element (RE) 1-30, and may be indicated as an OFDM symbol or SC-FDMA symbol index and a subcarrier index. A resource block (RB) 1-20 or a physical resource block (PRB) is defined as $N_{symb}$ successive OFDM symbols 1-05 in the time domain and $N_{RB}$ successive subcarriers 1-25 in the frequency domain. Accordingly, one RB 1-20 may be composed of $N_{symb} \times N_{RB}$ REs 1-30. In the LTE and LTE-A system, data is mapped in RB units, and a base station performs scheduling in RB-pair units consisting one subframe for a predetermined terminal. The number $N_{symb}$ of SC-FDMA symbols or OFDM symbols is determined according to a length of CP added for each symbol for inter-symbol interference prevention, and for example, when a general CP is applied, $N_{symb}=7$ and when an expandable CP is applied, $N_{symb}=6$. The extendable CP may be applied to a system having a relatively larger radio transmission distance than the general CP to maintain orthogonality between symbols.

According to some embodiments, the subcarrier spacing, the length of CP, and the like are essential information for OFDM transmission/reception, and seamless transmission/reception may be possible only when the base station and the terminal recognize the essential information as a common value.

A frame structures of the LTE and LTE-A systems as described above are designed in consideration of general voice/data communication, and are subject to limitations in scalability in satisfying various services and requirements like the 5G system. Accordingly, in the 5G system, a frame structure needs to be flexibly defined and operated considering various services and requirements.

Figure 2:
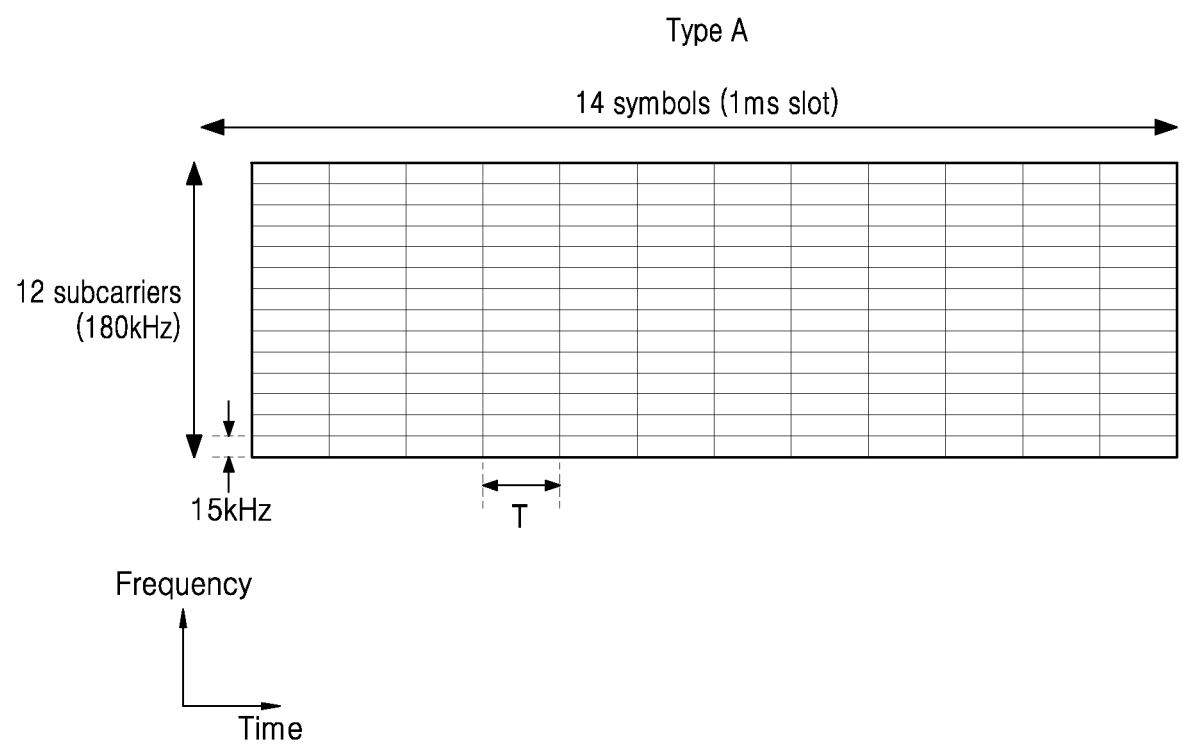
FIGS. 2 through 4 are diagrams of an expandable frame structure according to some embodiments.
Figure 3:
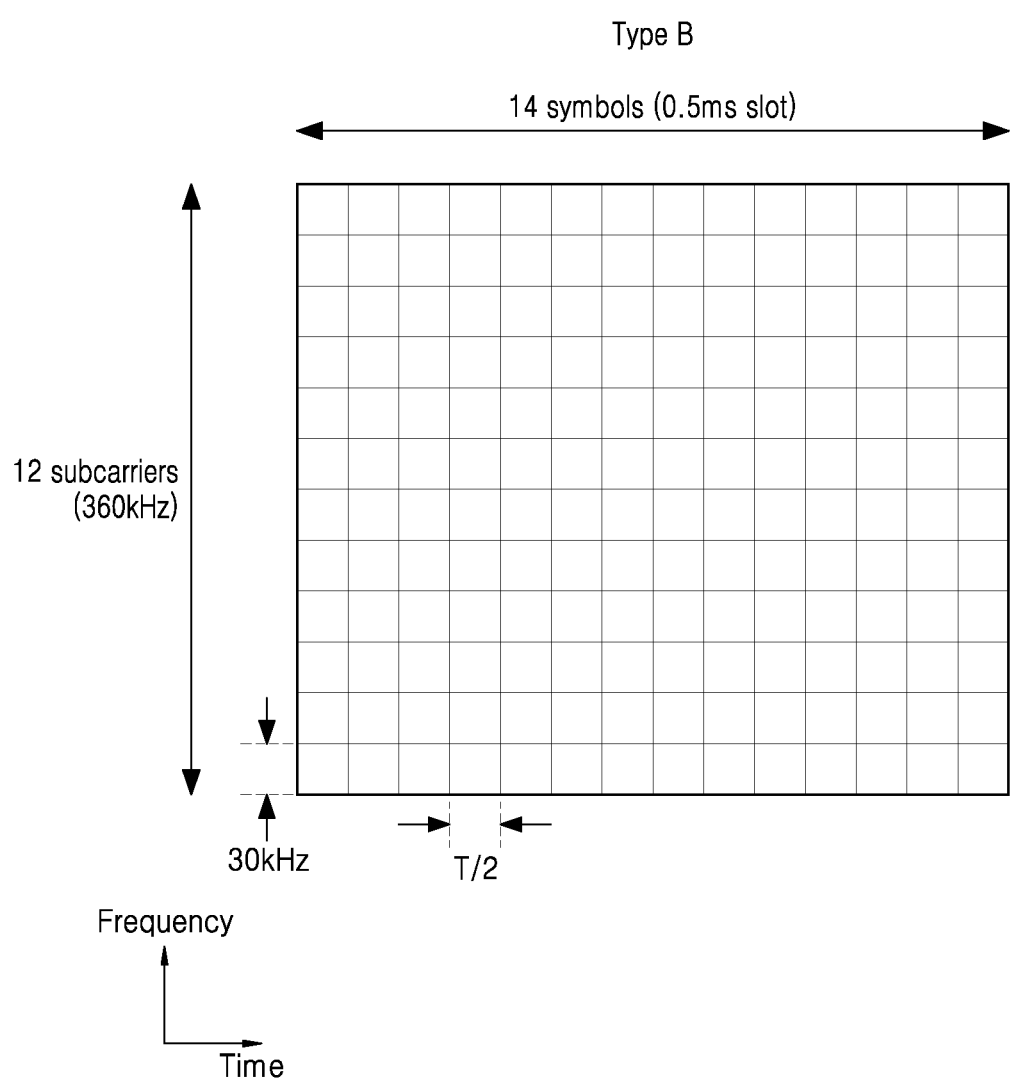
Figure 4:
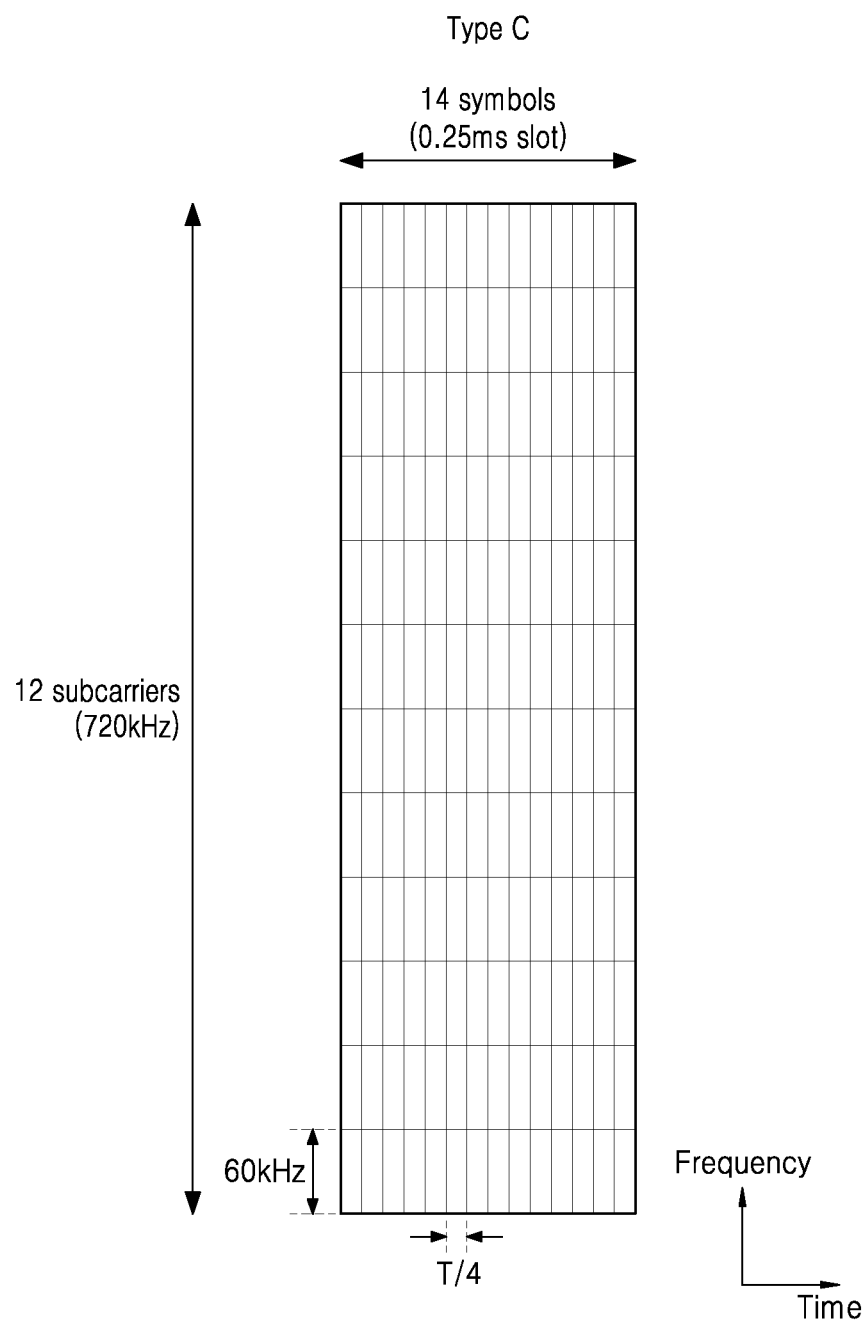

FIGS. 2 through 4 are diagrams of an expandable frame structure according to some embodiments.

Examples of FIGS. 2 through 4 are an essential parameter set defining an expandable frame structure and may include a subcarrier spacing, a length of CP, and a length of a slot.

In early days when a 5G system is introduced in the future, coexistence or dual mode operation with at least an existing LTE/LTE-A system is expected. In this regard, the existing LTE/LTE-A system may provide a stable system operation and the 5G system may provide an enhanced service. Accordingly, the expandable frame structure of the 5G system needs to include at least the essential parameter set or a frame structure of the LTE/LTE-A system. Referring to FIG. 2, the essential parameter set or a 5G frame structure identical to the frame structure of LTE/LTE-A system is illustrated. A frame structure type A shown in FIG. 2 indicates that a subcarrier spacing is 15 kHz, 14 symbols configure 1 ms slot, and a PRB is configured with 12 subcarriers (180 KHz=12×15 kHz).

Referring to FIG. 3, a frame structure type B shown in FIG. 3 indicates that a subcarrier spacing is 30 kHz, 14 symbols configure 0.5 ms slot, and a PRB is configured with 12 subcarriers (=360 KHz=12×30 kHz). In other words, the subcarrier spacing and a size of PRB are twice greater than those of the frame structure type A, and lengths of slot and symbol are twice less than those of the frame structure type A.

Referring to FIG. 4, a frame structure type C shown in FIG. 4 indicates that a subcarrier spacing is 60 kHz, 14 symbols configure 0.25 ms subframe, and a PRB is configured with 12 subcarriers (=720 KHz=12×60 kHz). In other words, the subcarrier spacing and a size of PRB are four times greater than those of the frame structure type A, and lengths of slot and symbol are four times less than those of the frame structure type A.

In other words, when the frame structure types are generalized, high scalability may be provided by setting the subcarrier spacings, the lengths of CPs, and the lengths of slots, which are the essential parameter set, to have integer multiples for each frame structure type. Also, a subframe of a fixed length of 1 ms may be defined to indicate a reference time unit irrelevant to the frame structure type. Accordingly, in the frame structure type A, one subframe consists of one slot, in the frame structure type B, one subframe consists of two slots, and in the frame structure type C, one subframe consists of four slots. Obviously, an expandable frame structure is not limited to the frame structure type A, B, or C described above, and may be applied to another subcarrier spacing, such as 120 KHz or 240 kHz, or may have a different structure.

According to some embodiments, the frame structure type described above may be applied to correspond to various scenarios. In terms of a cell size, a larger call is supportable when the length of CP is greater, and thus the frame structure type A may support a relatively large cell compared to the frame structure types B and C. In terms of an operation frequency band, phase noise recovery of a high frequency band is more advantageous when the subcarrier spacing is greater, and thus the frame structure type C may support a relatively high operation frequency compared to the frame structure types A and B. In terms of a service, it is more advantageous to support an ultra-low latency service, such as URLLC, when the length of subframe is shorter, and thus the frame structure type C is more suitable for a URLLC service than the frame structure types A and B.

Also, several frame structure types may be multiplexed in one system for integrated operation.

In an NR system, one component carrier (CC) or serving cell may be configured of 250 or more RBs. Accordingly, when a terminal always receives an entire serving cell bandwidth as in the LTE system, power consumption of the terminal may be severe, and to solve this, a base station may configure one or more bandwidth parts (BWPs) to the terminal to support the terminal to change a reception area in a cell. In the NR system, the base station may configure an 'initial BWP' that is a bandwidth of a control resource set (CORESET) #0 (or common search space (CSS)) to the terminal via a master information block (MIB). Then, the base station may configure the initial BWP of the terminal via radio resource control (RRC) signaling, and notify one or more pieces of BWP configuration information that may be indicated via downlink control information (DCI) later. Next, the base station may notify about a BWP identification (ID) via the DCI to indicate to the terminal which band to use. When the terminal does not receive the DCI from a currently assigned BWP for a specific period of time, the terminal may return to a 'default BWP' and try to receive the DCI.

Figure 5:
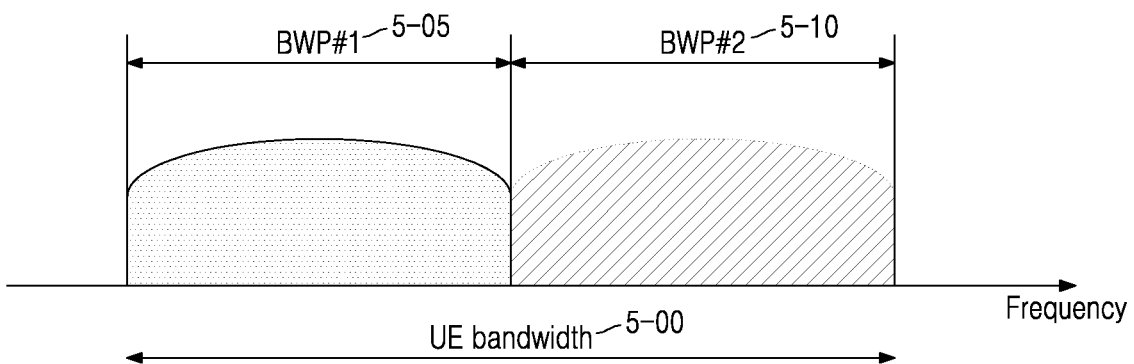
FIG. 5 is a diagram showing an example of configuring a bandwidth part in a $5^{th}$ generation (5G) communication system, according to some embodiments.

FIG. 5 is a diagram showing an example of configuring a bandwidth part in a 5G communication system, according to some embodiments.

Referring to FIG. 5, a terminal bandwidth 5-00 may be configured in two BWPs, i.e., a BWP #1 5-01 and a BWP #2 5-10. A base station may configure one or more BWPs to a terminal and may configure following pieces of information for each BWP.

TABLE 1

- Configuration Information 1: Bandwidth of BWP (The number of PRBs configuring a BWP)
- Configuration Information 2: Frequency Location of BWP (There may be offset value against a reference point as such information, and the reference point may include, for example, a center frequency of carrier waves, a synchronization, signal, or a synchronization signal raster)
- Configuration Information 3: Numerology of BWP (For example, a subcarrier spacing, a length of CP, or the like)
- Others In addition to configuration information of Table 1, various parameters related to a BWP may be configured to the terminal. The configuration information may be transmitted by the base station to the terminal via higher layer signaling, for example, RRC signaling. At least one BWP from among the configured one or more BWPs may be activated. Whether to activate the configured BWP may be may be transmitted from the base station to the terminal semi-statically via RRC signaling or dynamically via a medium access control (MAC) control element (CE) or DCI.

Configuration of a BWP supported in the 5G communication system may be used for various purposes.

For example, when a bandwidth supported by the terminal is smaller than a system bandwidth, it may be supported via the configuration of a BWP. For example, by configuring a frequency location (configuration information 1) of a BWP in Table 1 to the terminal, the terminal may transmit/receive data at a specific frequency location in the system bandwidth.

As another example, the base station may configure a plurality of BWPs to the terminal for a purpose of supporting different numerologies. For example, to support data transmission/reception using both subcarrier spacing of 15 kHz and subcarrier spacing of 30 kHz for a terminal, two BWPs may be configured to respectively use the subcarrier spacings of 15 kHz and 30 KHz. Frequency division multiplexing (FDM) may be performed on the different BWPs, and when data is to be transmitted/received in a specific subcarrier spacing, a BWP configured at the corresponding subcarrier spacing may be activated.

As another example, the base station may configure BWPs having different sizes of bandwidths to the terminal for a purpose of reducing power consumption of the terminal. For example, when the terminal supports a very large bandwidth, for example, a bandwidth of 100 MHZ, and always transmits/receives data via the corresponding bandwidth, very large power consumption may occur. In particular, it is very inefficient in terms of power consumption for the terminal to monitor an unnecessary DL control channel for a large bandwidth of 100 MHz in a situation where there is no traffic. Accordingly, the base station may configure a BWP of a relatively small bandwidth, for example, a BWP of 20 MHz, to the terminal for a purpose of reducing the power consumption of the terminal. In a situation where there is no traffic, the terminal may perform a monitoring operation in a BWP of 20 MHZ, and when data is generated, the terminal may transmit/receive the data by using a BWP of 100 MHz according to an instruction of the base station.

Figure 6:
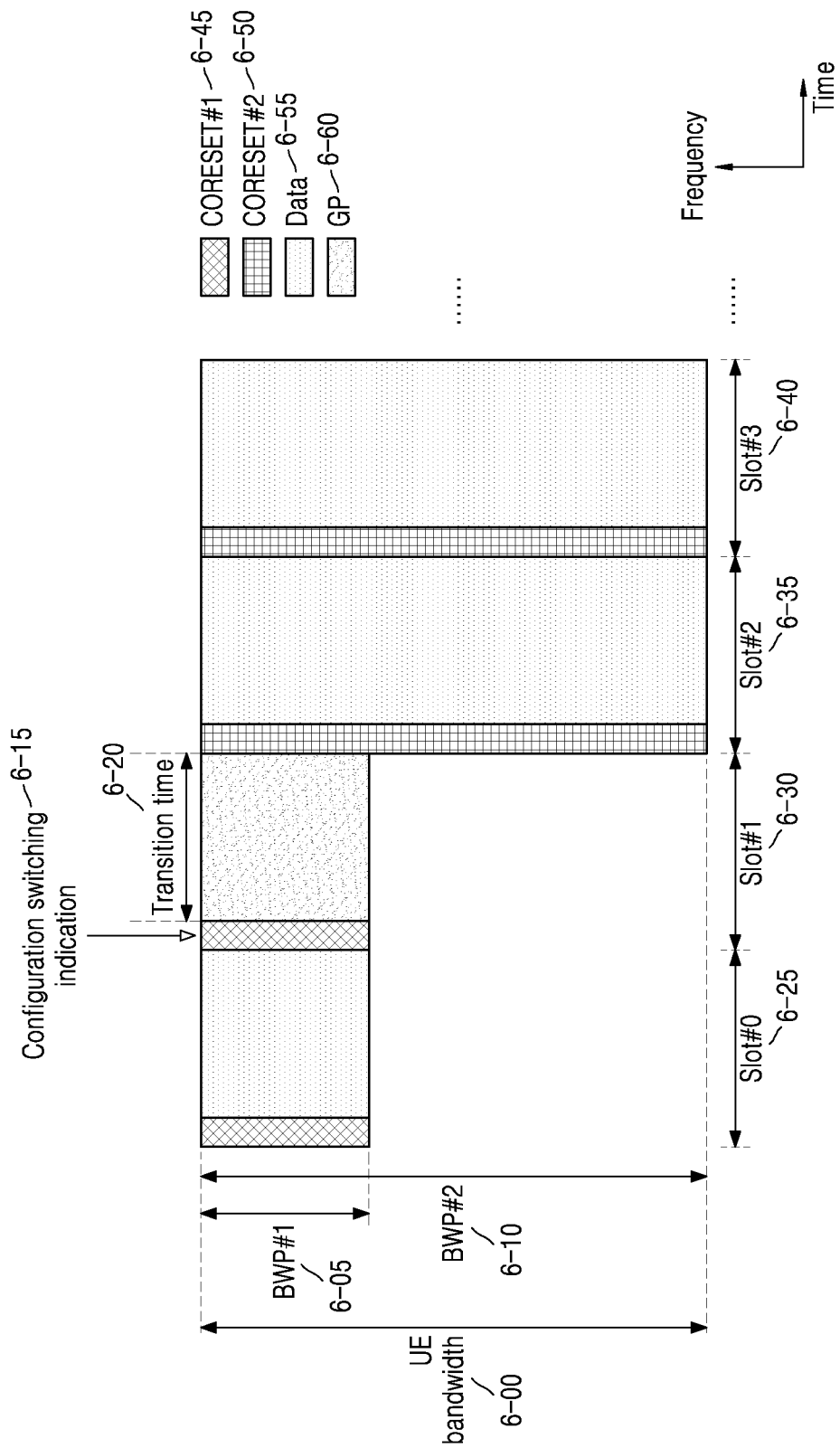
FIG. 6 is a diagram showing a method of indicating and switching a bandwidth part, according to some embodiments.

FIG. 6 is a diagram showing a method of indicating and switching dynamic configuration for a BWP, according to some embodiments.

As described with reference to Table 1, a base station may configure one or more BWPs to a terminal, and information about a bandwidth of a BWP, a frequency location of the BWP, and a numerology of the BWP may be notified via configuration for each BWP. Referring to FIG. 6, two BWPs, i.e., a BWP #1 6-05 and a BWP #2 6-10, may be configured in a terminal bandwidth 6-00 for the terminal. Among the configured bandwidths, one or more BWPs may be activated, and FIG. 6 illustrates an example in which one BWP is activated. In FIG. 6, the BWP #1 6-05 is activated among the configured BWPs in a slot #0 6-25 and the terminal may monitor a physical downlink control channel (PDCCH) in a CORESET #1 6-45 configured in the BWP #1 6-05 and transmit/receive data 6-55 in the BWP #1 6-05. A CORESET on which the terminal receives PDCCH may vary depending on which one of the configured BWPs is activated, and accordingly, a bandwidth in which the terminal monitors PDCCH may vary.

The base station may additionally transmit, to the terminal, an indicator for switching the configuration for BWP.

Here, changing of the configuration for BWP may be considered to be the same as an operation for activating a specific BWP (for example, switching activation from a BWP A to a BWP B). The base station may transmit a configuration switching indicator to the terminal from a specific slot, and the terminal may determine a BWP to be activated by applying a configuration switched according to the configuration switching indicator from a specific time after receiving the configuration switching indicator from the base station and perform the monitoring on the PDCCH on a CORESET configured in the activated BWP.

In FIG. 6, the base station may transmit, to the terminal from a slot #1 6-30, a configuration switching indicator 6-15 indicating to switch the activated BWP from the existing BWP #1 6-05 to the BWP #2 6-10. After receiving the indicator, the terminal may activate the BWP #2 6-10 according to content of the indicator. Here, a transition time 6-20 for switching of BWP may be required, and accordingly, a time when the activated BWP is switched and applied may be determined. In FIG. 6, the transition time 6-20 of one slot is required after the configuration switching indicator 6-15 is received. Data transmission/reception may not be performed in the transition time 6-20 (6-60). Accordingly, the BWP #2 6-10 may be activated in a slot #2 6-35, and thus an operation of transmitting/receiving a control channel and data may be performed in the corresponding BWP #2.

The base station may pre-configure one or more BWPs to the terminal via higher layer signaling (for example, RRC signaling) and the configuration switching indicator 6-15 may indicate activation in a method of mapping with one of BWP configurations pre-configured by the base station. For example, in an indicator of log 2N bits may select and indicate one of N pre-configured BWPs. Table 2 below is an example of indicating configuration information for a BWP by using a 2-bit indicator.

TABLE 2

| Indicator Value | BWP Configuration |
|---|---|
| 00 | Bandwidth configuration A configured via higher layer signaling |
| 01 | Bandwidth configuration B configured via higher layer signaling |
| 10 | Bandwidth configuration C configured via higher layer signaling |
| 11 | Bandwidth configuration D configured via higher layer signaling |

The configuration switching indicator 6-15 for the BWP described above may be transmitted from the base station to the terminal via MAC CE signaling or L1 signaling (for example, common DCI, group-common DCI, or terminal-specific DCI).

From which time point the BWP activation is to be applied according to the configuration switching indicator 6-15 for the BWP described above depends on the following. From which time point a configuration switch is to be applied depends on a pre-defined value (for example, after receiving a configuration switching indicator, it may be applied from after the N (≥1) slot), or may be configured by the base station to the terminal via higher layer signaling (for example, RRC signaling) or may be partially included in the content of the configuration switching indicator 6-15 and transmitted. Alternatively, the time point may be determined in a combination of the above methods. After receiving the configuration switching indicator 6-15 for the BWP, the terminal may apply the switched configuration from a time point when the switched configuration is obtained via the above method.

In an NR system, following detailed frequency axis resource assignment methods (frequency domain resource allocation (FD-RA)) are provided in addition to a frequency axis resource candidate assignment via BWP indication.

Figure 7:
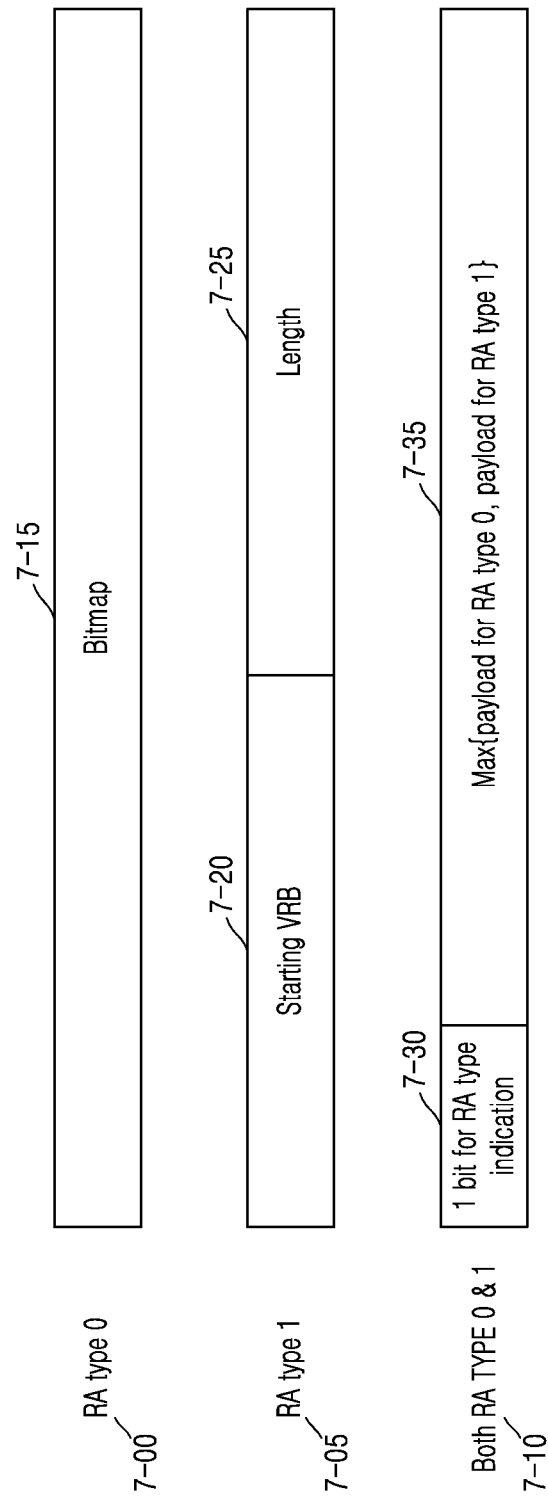
FIG. 7 is a diagram showing an example of physical downlink shared channel (PDSCH) frequency axis resource assignment according to some embodiments.

FIG. 7 is a diagram showing an example of physical downlink shared channel (PDSCH) frequency axis resource assignment according to some embodiments. Referring to FIG. 7, three frequency axis resource assignment methods of type 0 7-00, type 1 7-05, and dynamic switch 7-10, which are configurable via higher layer in an NR system, are illustrated.

When a terminal is configured to use only resource type 1 (7-00) via higher layer signaling, partial DCI assigning a PDSCH to the terminal may include a bitmap consisting of $N_{RBG}$ bits. A condition for this will be described later. Here, $N_{RBG}$ denotes the number of resource block groups (RBGs) determined as Table 3 below according to a BWP size assigned by a BWP indicator and a higher layer parameter rbg-Size, and data is transmitted to a RBG indicated by 1 by the bitmap.

TABLE 3

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the terminal is configured to use only resource type 2 (7-05) via higher layer signaling, partial DCI assigning a PDSCH to the terminal may include frequency axis resource assignment information consisting of $\lceil \log_2(N_{RB}^{DL,BWP}(N_{RB}^{DL,BWP}+1)/2) \rceil$ bits. A condition for this will be described later. Accordingly, it is possible for a base station to configure a starting virtual resource block (VRB) 7-20 and a length 7-25 of frequency axis resources assigned continuously therefrom.

When the terminal is configured to use both resource type 0 and resource type 1 (7-10) via higher layer signaling, partial DCI assigning PDSCH to the terminal may include frequency axis resource assignment information configured of bits of a larger value 7-35 among a payload 7-15 for configuring the resource type 0 and payloads 7-20 and 7-25 for configuring the resource type 1. A condition for this will be described later. At this time, one bit is added to a front portion (most significant bit (MSB)) of the frequency axis resource assignment information in the DCI, and when the corresponding bit is 0, it indicates that the resource type 0 is used, and when the corresponding bit is 1, it indicates that the resource type 1 is used.

Figure 8:
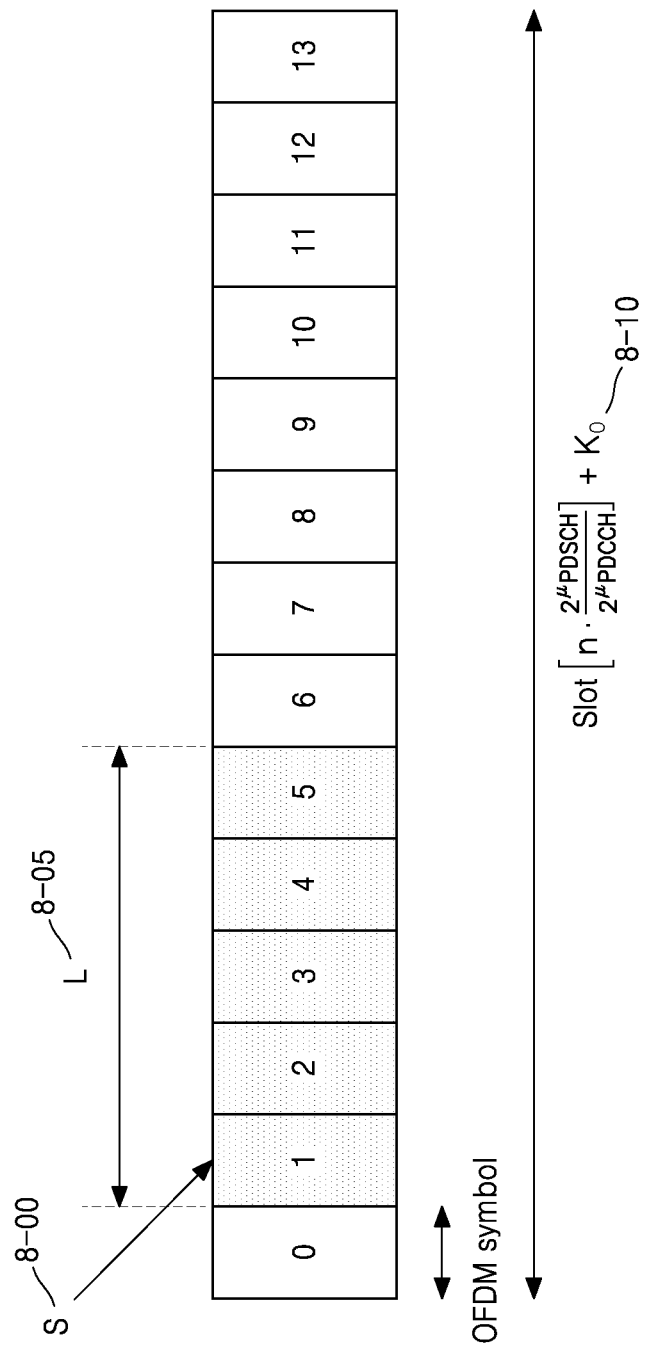
FIG. 8 is a diagram showing an example of PDSCH time axis resource assignment according to some embodiments.

FIG. 8 is a diagram showing an example of PDSCH time axis resource assignment according to some embodiments.

Referring to FIG. 8, it is possible for a base station to indicate a time axis location of a PDSCH resource according to subcarrier spacings UPDSCH and UPDCCH of a data channel and control channel configured in a higher layer, a scheduling offset value $K_0$, and an OFDM symbol start location 8-00 and length 8-05 in one slot dynamically indicated via DCI.

Figure 9:
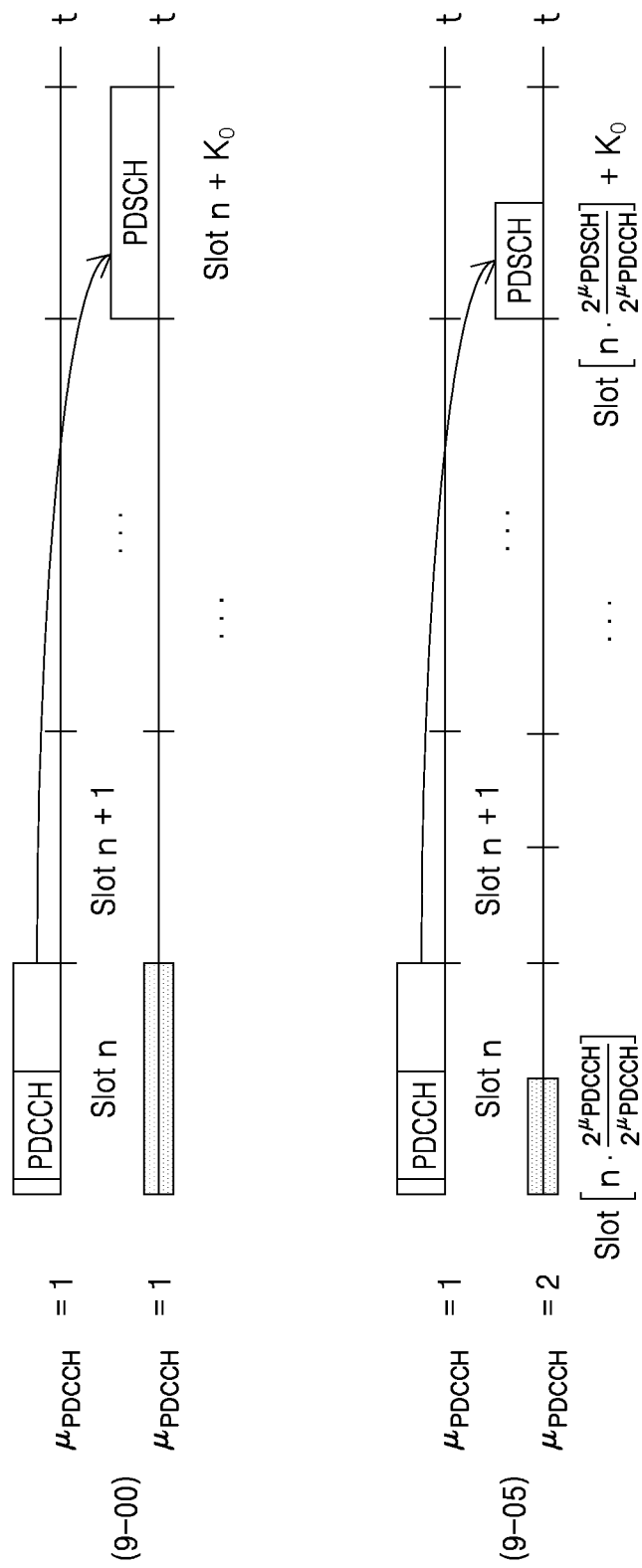
FIG. 9 is a diagram showing an example of PDSCH time axis resource assignment according to subcarrier spacings of a data channel and control channel, according to some embodiments.

FIG. 9 is a diagram showing an example of PDSCH time axis resource assignment according to subcarrier spacings of a data channel and control channel, according to some embodiments.

Referring to FIG. 9, when the subcarrier spacings of the data channel and control channel are the same (9-00, $\mu_{PDSCH}=\mu_{PDCCH}$), slot numbers of data and control are the same, and thus a base station and a terminal may determine that a scheduling offset occur according to a pre-determined slot offset $K_0$. On the other hand, when the subcarrier spacings of the data channel and control channel are different (9-05, $\mu_{PDSCH}\neq\mu_{PDCCH}$), the slot numbers of data and control are different, and thus the base station and the terminal may determine that the scheduling offset occur according to the pre-determined slot offset $K_0$ based on a subcarrier spacing of PDCCH.

In an NR system, various types of DCI formats are provided as shown in Table 4 below according to purposes for efficient control channel reception of the terminal.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the base station may use DCI format 1_0 or DCI format 1_1 to assign (schedule) a PDSCH to one cell.

The DCI format 1_1 includes at least following pieces of information when transmitted together with a cyclic redundancy check (CRC) scrambled according to a cell radio network temporary identifier (C-RNTI), configured scheduling RNTI (CS-RNTI), or modulation and coding scheme C-RNTI (MCS-C-RNTI).

Identifier for DCI formats (1 bit): 1 is always configured for a DCI format indicator.
Frequency domain resource assignment ($\lceil \log_2(N_{RB}^{DL,BWP}(N_{RB}^{DL,BWP}+1)/2)\rceil$ bits): Indicates frequency axis resource assignment and when DCI format 1_0 is monitored in a UE-specific search space, $N_{RB}^{DL,BWP}$ is a size of an active DL BWP and in other cases, $N_{RB}^{DL,BWP}$ is a size of an initial DL BWP. For a detailed method, refer to the frequency axis resource assignment above.
Time domain resource assignment (4 bits): Time axis resource assignment is indicated according to the above description.
VRB-to-PRB mapping (1 bit): When 0, non-interleaved is indicated and when 1, interleaved VRP-to-PRB mapping is indicated.
Modulation and coding scheme (5 bits): Indicates a modulation order and coding rate used in PDSCH transmission.
New data indicator (1 bit): Indicates initial transmission or retransmission of PDSCH depending on toggle.
Redundancy version (2 bits): Indicates a redundancy version used for PDSCH transmission.
HARQ process number (4 bits): Indicates an HARQ process number used for PDSCH transmission.
Downlink assignment index (2 bits): Downlink assignment index (DAI) indicator
TPC command for scheduled PUCCH (2 bits): PUCCH power control indicator
PUCCH resource indicator (3 bits): PUCCH resource indicator and indicates one of 8 resources configured via a higher layer.
PDSCH-to-HARQ_feedback timing indicator (3 bits): HARQ feedback timing indicator and indicates one of 8 feedback timing offsets configured via a higher layer.

The DCI format 1_1 includes at least following pieces of information when transmitted together with a CRC scrambled according to a C-RNTI, CS-RNTI, or MCS-C-RNTI.

Identifier for DCI formats (1 bit): 1 is always configured for a DCI format indicator.
Carrier indicator (0 or 3 bits): Indicates a CC (or cell) where PDSCH assigned by corresponding DCI is transmitted.
Bandwidth part indicator (0, 1, or 2 bits): Indicates a BWP where PDSCH assigned by corresponding DCI is transmitted.
Frequency domain resource assignment (Payload determination according to frequency axis resource assignment): Indicates frequency axis resource assignment, and $N_{RB}^{DL,BWP}$ is a size of an active DL BWP. For a detailed method, refer to the frequency axis resource assignment above.
Time domain resource assignment (4 bits): Time axis resource assignment is indicated according to the above description.
VRB-to-PRB mapping (0 or 1 bit): When 0, non-interleaved is indicated and when 1, interleaved VRP-to-PRB mapping is indicated. It is 0 bit when the frequency axis resource assignment is configured to resource type 0.
PRB bundling size indicator (0 or 1 bit): It is 0 bit when a higher layer parameter prb-BundlingType is not configured or configured to 'static', and it is 1 bit when configured to 'dynamic'.
Rate matching indicator (0, 1, or 2 bits): Indicates a rate matching pattern.
ZP CSI-RS trigger (0, 1, or 2 bits): An indicator triggering an aperiodic ZP CSI-RS.
For transport block 1:
Modulation and coding scheme (5 bits): Indicates a modulation order and coding rate used in PDSCH transmission.
New data indicator (1 bit): Indicates initial transmission or retransmission of PDSCH depending on toggle.
Redundancy version (2 bits): Indicates a redundancy version used for PDSCH transmission.
For transport block 2:
Modulation and coding scheme (5 bits): Indicates a modulation order and coding rate used in PDSCH transmission.
New data indicator (1 bit): Indicates initial transmission or retransmission of PDSCH depending on toggle.
Redundancy version (2 bits): Indicates a redundancy version used for PDSCH transmission.
HARQ process number (4 bits): Indicates an HARQ process number used for PDSCH transmission.
Downlink assignment index (0, 2, or 4 bits): DAI indicator.
TPC command for scheduled PUCCH (2 bits): PUCCH power control indicator
PUCCH resource indicator (3 bits): PUCCH resource indicator and indicates one of 8 resources configured via a higher layer.

PDSCH-to-HARQ_feedback timing indicator (3 bits): HARQ feedback timing indicator and indicates one of 8 feedback timing offsets configured via a higher layer.

Antenna port (4, 5, or 6 bits): Indicates a DMRS port and CDM group without data.

Transmission configuration indication (0 or 3 bits): TCI indicator.

SRS request (2 or 3 bits): SRS transmission request indicator.

CBG transmission information (0, 2, 4, 6, or 8 bits): An indicator notifying transmission of code block groups in an assigned PDSCH. 0 indicates that a corresponding CBG is not transmitted and 1 indicates that the corresponding CBG is transmitted.

CBG flushing out information (0 or 1 bit): An indicator indicating contamination of previous CBGs, and 0 indicates possibility of contamination and 1 indicates usable when receiving retransmission (combinable).

DMRS sequence initialization (0 or 1 bit): DMRS scrambling ID selection indicator.

The number of different sizes of pieces of DCI receivable by the terminal per slot in a corresponding cell is up to 4. The number of different sizes of pieces of DCI scrambled via C-RNTI receivable by the terminal per slot in a corresponding cell is up to 3.

Figure 10:
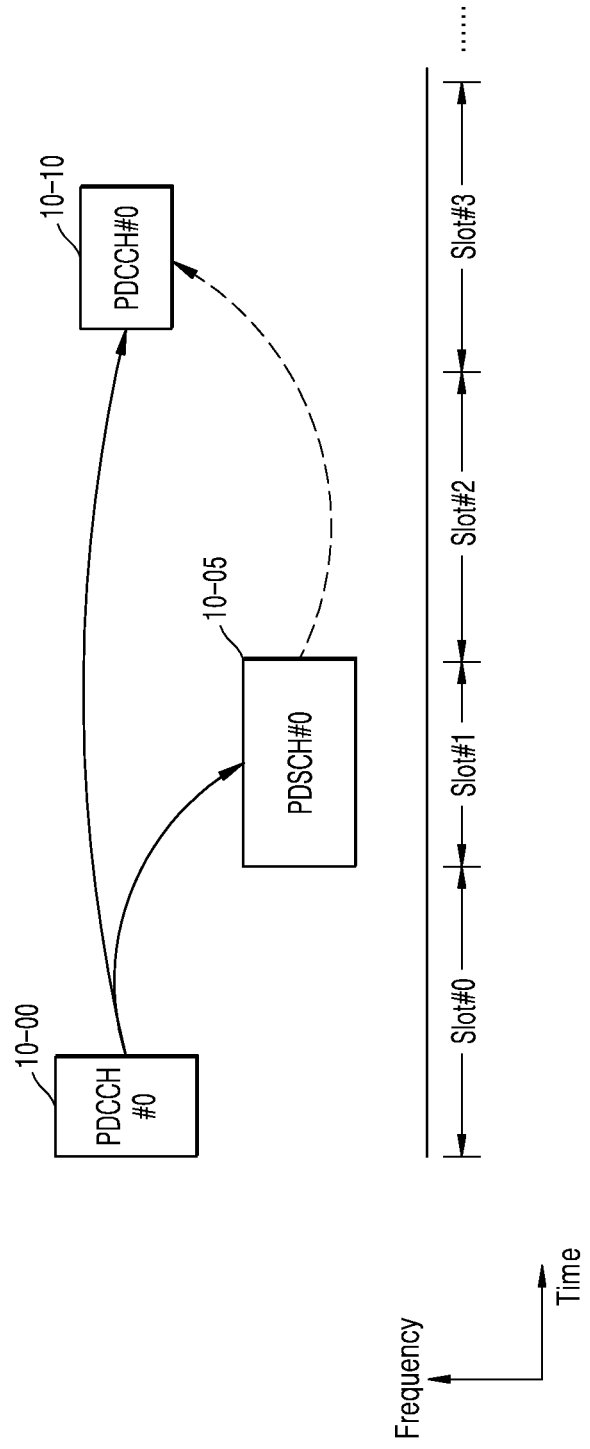
FIG. 10 is a diagram showing an example of physical uplink control channel (PUCCH) resource assignment for hybrid automatic repeat request-acknowledgement (HARQ-ACK) feedback, according to some embodiments.

FIG. 10 is a diagram showing an example of physical uplink control channel (PUCCH) resource assignment for hybrid automatic repeat request-acknowledgement (HARQ-ACK) feedback, according to some embodiments.

When PDSCH 10-05 that is DL data is scheduled based on DCI of PDCCH 10-00, the PDSCH is transmitted and slot information to which HARQ-ACK feedback corresponding thereto is mapped, and mapping information of PUCCH 10-10 of UL control channel where HARQ-ACK feedback information is transmitted are transmitted. In detail, a slot interval between the PDSCH that is DL data and the HARQ-ACK feedback corresponding thereto is indicated via a PDSCH-to-HARQ_feedback timing indicator, and one of eight feedback timing offsets configured as a higher layer is indicated. Also, one of eight resources configured as a higher layer via a PUCCH resource indicator is indicated to transmit a PUCCH resource including a mapping symbol number, a location of a start symbol, a type of UL control channel PUCCH to which the HARQ-ACK feedback information is mapped.

A terminal gathers and transmits HARQ-ACK feedback bits so as to transmit HARQ-ACK information to a base station, and the gathered HARQ-ACK feedback bits may be interchangeably referred to as a HARQ-ACK codebook hereinbelow. The base station may configure, to the terminal, a Type-1 HARQ-ACK codebook for transmitting HARQ-ACK feedback bits corresponding to PDSCH transmittable at a slot location of a pre-determined timing regardless of actual transmission of PDSCH. Alternatively, the base station may configure, to the terminal, a Type-2 HARQ-ACK codebook for managing and transmitting HARQ-ACK feedback bits corresponding to an actually transmitted PDSCH via counter DAI or total DAI.

When the terminal is configured with Type-1 HARQ-ACK codebook, a table including information about a number or lengths of symbols, a start symbol, and a slot to which PDSCH is mapped, and a feedback bit to be transmitted via K1 candidate values that are HARQ-ACK feedback timing information for the PDSCH may be determined. The table including the information about the number or lengths of symbols, the start symbol, and the slot to which PDSCH is mapped may be configured via higher layer signaling or determined as a default table. Also, the K1 candidate values may be determined as default values, for example, {1,2,3,4,5,6,7,8}, or may be determined via higher layer signaling.

When a set of PDSCH reception candidates in a serving cell c is $M_{A,c}$, the $M_{A,c}$ may be obtained via [pseudo-code 1] operations below.

[Start Pseudo-Code 1]

Operation 1: Initialize j to 0, $M_{A,c}$ to an empty set, and a HARQ-ACK transmission timing index k to 0.

Operation 2: Configure R as a set of rows in the table including the information about the number or lengths of symbols, the start symbol, and the slot to which PDSCH is mapped. When a symbol to which a PDSCH indicated by each row of R is mapped is configured as an UL symbol according to higher layer configuration, the corresponding row is deleted from R.

Operation 3-1: When the terminal is able to receive a PDSCH for unicast in one slot and R is not an empty set, add k to the set $M_{A,c}$.

Operation 3-2: When the terminal is able to receive more than one PDSCH in one slot, add j to $M_{A,c}$ while increasing j by 1 from the maximum number of PDSCHs assignable to different symbols in R.

Operation 4: Start from operation 2 by increasing k by 1.

[End Pseudo-Code 1]

HARQ-ACK feedback bits may be determined via operations of [pseudo-code 2] below for $M_{A,c}$ determined via [pseudo-code 1].

[Start Pseudo-Code 2]

Operation 1: Initialize an HARQ-ACK reception occasion index m to 0 and an HARQ-ACK feedback bit index j to 0.

Operation 2-1: When the terminal is not instructed for HARQ-ACK bundling for a codeword via higher layer signaling, is not instructed for CBG transmission of PDSCH, and is instructed to receive up to two codewords via one PDSCH, configure a HARQ-ACK feedback bit for each codeword by increasing j by 1.

Operation 2-2: When the terminal is instructed for HARQ-ACK bundling for a codeword via higher layer signaling and is instructed to receive up to two codewords via one PDSCH, configure a HARQ-ACK feedback bit for each codeword as one HARQ-ACK feedback bit via a binary AND operation.

Operation 2-3: When the terminal is instructed for CBG transmission of PDSCH via higher layer signaling and is not instructed to receive up to two codewords via one PDSCH, configure HARQ-ACK feedback bits by the number of CBGs for one codeword while increasing j by 1.

Operation 2-4: When the terminal is instructed for CBG transmission of PDSCH via higher layer signaling and is instructed to receive up to two codewords via one PDSCH, configure HARQ-ACK feedback bits by the number of CBGs for each codeword while increasing j by 1.

Operation 2-5: When the terminal is not instructed for CBG transmission of PDSCH via higher layer signaling and is not instructed to receive up to two codewords via one PDSCH, configure HARQ-ACK feedback bits for one codeword.

Operation 3: Start from operation 2-1 by increasing m by 1.

[End Pseudo-Code 2]

When the terminal is configured with the Type-2 HARQ-ACK codebook, a feedback bit to be transmitted is determined via K1 candidate values that are HARQ-ACK feedback timing information for PDSCH and counter DAI or total DAI for managing HARQ-ACK feedback bits corresponding to the PDSCH. The K1 candidate values that is the HARQ-ACK feedback timing information for PDSCH are configured of a union of values assigned via higher layer signaling and default values. For example, the default values may be determined as {1,2,3,4,5,6,7,8}.

When counter DAI of DCI format 1_0 or DCI format 1_1 to which the PDSCH is assigned by the serving cell c at a PDCCH monitoring timing m is $V_{C\text{-}DAI,c,m}^{DL}$ and total DAI of DCI format 1_1 to which the PDSCH is assigned at the PDCCH monitoring timing m of an UL control channel is $V_{T\text{-}DAI,c,m}^{DL}$, the Type-2 HARQ-ACK codebook may be configured via operations of [pseudo-code 3] below.

[Start Pseudo-Code 3]
  Operation 1: Initialize the serving cell index c to 0, the PDCCH monitoring timing m to 0, j to 0, indexes $V_{temp}$ and $V_{temp2}$ for DAI comparison to 0, and a HARQ-ACK feedback bit set Vs to an empty set.
  Operation 2: When the PDCCH monitoring timing m is prior to a DL BWP change for the serving cell c or prior to an UL BWP change for a PCell, and the DL BWP change is not triggered by DCI format 1_1 of the PDCCH monitoring timing m, exclude c from a serving cell set.
  Operation 3-1: When a PDSCH assigned by a PDCCH corresponding to the PDCCH monitoring timing m is present in the serving cell c, increase j by 1 when $V_{C\text{-}DAI,c,m}^{DL}$ is equal to or less than $V_{temp}$ and configure $V_{temp}$ as $V_{C\text{-}DAI,c,m}^{DL}$. Also, when $V_{T\text{-}DAI,c,m}^{DL}$ is an empty set, configure $V_{temp2}$ as $V_{C\text{-}DAI,c,m}^{DL}$ and when $V_{T\text{-}DAI,c,m}^{DL}$ is not an empty set, set $V_{temp2}$ as $V_{T\text{-}DAI,c,m}^{DL}$.
  Operation 3-2: When the PDSCH assigned by the PDCCH corresponding to the PDCCH monitoring timing m is present in the serving cell c, the terminal is not instructed for the HARQ-ACK bundling for the codeword via higher layer signaling, and is instructed to receive up to two codewords from at least one DL BWP of at least one serving cell via one PDSCH, configure the HARQ-ACK feedback bit for each codeword by increasing j by 1.
  Operation 3-3: When the PDSCH assigned by the PDCCH corresponding to the PDCCH monitoring timing m is present in the serving cell c, the terminal is instructed for the HARQ-ACK bundling for the codeword via higher layer signaling, and is instructed to receive up to two codewords from at least one DL BWP of at least one serving cell via one PDSCH, configure the HARQ-ACK feedback bit for each codeword as one HARQ-ACK feedback bit via a binary AND operation.
  Operation 3-4: When the PDSCH assigned by the PDCCH corresponding to the PDCCH monitoring timing m is present in the serving cell and the terminal is not instructed to receive up to two codewords via one PDSCH, configure HARQ-ACK feedback bits for one codeword.
  Operation 4: Start from operation 2 by increasing c by 1.
  Operation 5: Start from operation 2 by increasing m by 1.
  Operation 6: Increase j by 1 when $V_{temp2}$ is smaller than $V_{temp}$.
  Operation 7-1: When the terminal is not instructed for the HARQ-ACK bundling for the codeword via higher layer signaling and is instructed to receive up to 2 codewords via one PDSCH from at least one DL BWP of at least one serving cell, configure the number of entire HARQ-ACK feedback bits to $2 \cdot (4 \cdot j + V_{temp2})$.
  Operation 7-2: When the terminal is instructed for the HARQ-ACK bundling for the codeword via higher layer signaling or is not instructed to receive up to two codewords via one PDSCH, configure the number of entire HARQ-ACK feedback bits to $4 \cdot j + V_{temp2}$.
  Operation 8: Determine HARQ-ACK feedback bits to be NACK for HARQ-ACK feedback bits not configured in operations 3-1, 3-2, 3-3, and 3-4.
[End Pseudo-Code 3]

Referring to the DCI structure and HARQ-ACK codebook determination described above, in release 15, the HARQ-ACK codebook is focused on transmitting a single HARQ-ACK codebook from a specific slot for a PDSCH transmitted from a single transmission point. Thus, additional standard support is required for cooperative communication capable of transmitting a plurality of HARQ-ACK codebooks for a PDSCH transmitted from a plurality of points. For example, a method of determining the HARQ-ACK codebook determines the number of bits for the HARQ-ACK codebook corresponding to one PUCCH and HARQ-ACK feedback information, and thus a method for expanding the method is required to determine HARQ-ACK codebooks corresponding to two or more PUCCHs.

In the present disclosure, cooperative communication efficiency is improved by providing a HARQ-ACK feedback bit design method for efficiently determining HARQ-ACK codebooks for a plurality of PUCCHs.

Hereinafter, embodiments of the present disclosure will be described in detail with reference to accompanying drawings. While describing the present disclosure, detailed description of related functions or configurations may be omitted when it is deemed that they may unnecessarily obscure the essence of the present disclosure. Also, terms used below are defined in consideration of functions in the present disclosure, and may have different meanings according to an intention of a user or operator, customs, or the like. Thus, the terms should be defined based on the description throughout the specification.

Hereinafter, a base station is an entity that assigns resources of a terminal, and may be at least one of a next generation node B (gNB), an evolved node B (eNB), a node B (NB), a base station (BS), a wireless access unit, a base station controller, or a node on a network. Examples of a terminal may include user equipment (UE), a mobile station (MS), a cellular phone, a smartphone, a computer, and a multimedia system capable of performing a communication function. Also, hereinbelow, one or more embodiments of the present disclosure will be described as an example of an NR, LTE, or LTE-A system, but the one or more embodiments of the present disclosure may also be applied to other communication systems having a similar technical background or channel form. Also, it will be understood by one of ordinary skill in the art that embodiments of the present disclosure may be applied to other communication systems through some modifications without departing from the scope of the present disclosure.

The content of the present disclosure may be applied to frequency division duplex (FDD) or time division duplex (TDD) systems.

In the present disclosure, higher signaling is a method of transmitting a signal from the base station to the terminal by using a DL data channel of a physical layer or from the terminal to the base station by using a UL data channel of the physical layer, and may also be referred to as RRC signaling, packet data convergence protocol (PDCP) signaling, or MAC CE.

Hereinafter, the above examples will be described in the present disclosure through a plurality of embodiments, but the embodiments are not independent and one or more embodiments may be applied simultaneously or in combination.

In the embodiments of the present disclosure, a "cooperative transmission and reception point (TRP)" may be replaced by any one of various terms, such as "cooperative panel", a "cooperative beam", or the like, when actually applied.

In the embodiments of the present disclosure, "in non-coherent joint transmission (NC-JT)" or "when NC-JT is applied" may be variously interpreted according to situations, for example, "when a terminal receives one or more PDSCHs simultaneously from one BWP", "when a terminal receives a PDSCH based on two or more transmission configuration indications (TCIs) simultaneously from one BWP", and "when a PDSCH received by a terminal is associated with one or more demodulation reference signal (DMRS) port groups", but is used in the above expression for convenience of description.

In the embodiments of the present disclosure, a terminal in a cooperative communication environment may receive information by a plurality of TRPs having various channel qualities. Among them, a TRP that provides main control information because of best channel quality is named serving TRP and other remaining TRPs are named cooperative TRPs.

First Embodiment: Type-1 HARQ-ACK Codebook Payload Reduction for NC-JT

Unlike an existing communication system, a 5G wireless communication system may support not only a service requiring a high data rate, but also both a service having a very short transmission latency and a service requiring high connection density. Cooperative communication (coordinated transmission) between cells, TRPs, and/or beams in a wireless communication network including a plurality of cells, TRPs, or beams is one of element technologies that satisfy various service requirements by efficiently performing inter-cell, TRP, and/or beam interference control or by increasing strength of a signal received by a terminal.

JT is a representative transmission technology for cooperative communication, and may increase strength of a signal received by a terminal by supporting one terminal through different cells, TRPs, and/or beams via a technology. Because characteristics of channels between a terminal and cells, TRPs, and/or beams may differ greatly, different precodings, MCSs, and resource assignments need to be applied to links between the terminal and the cells, TRPs, and/or beams. In particular, in NC-JT supporting non-coherent precoding between cells, TRPs, and/or beams, individual DL transmission information configuration for the cells, TRPs, and/or beams is important.

Figure 11:
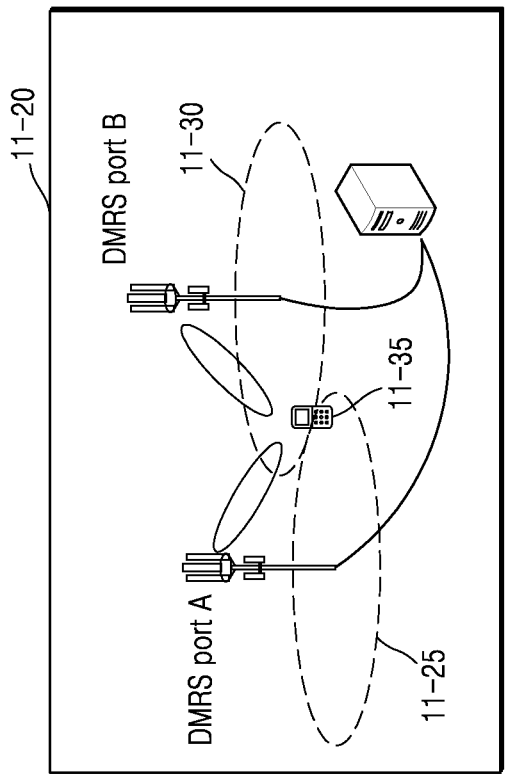
FIG. 11 is a diagram showing a configuration example of a cooperative communication antenna port, according to some embodiments.
Figure 11:
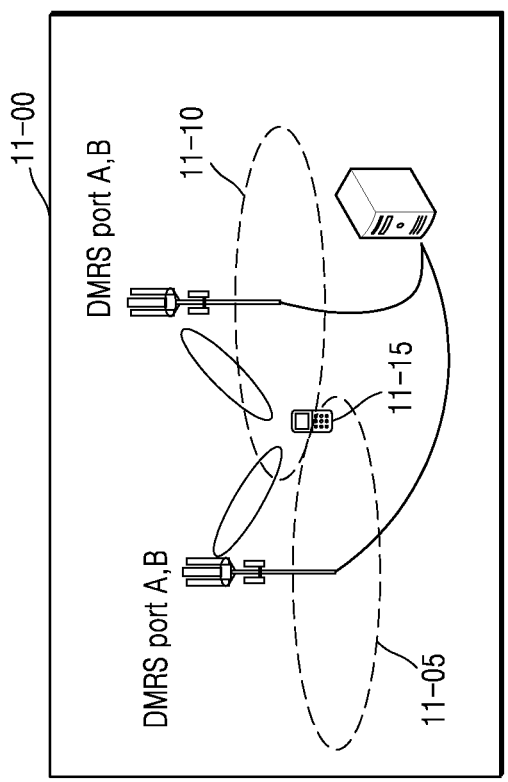

FIG. 11 is a diagram showing a configuration example of a cooperative communication antenna port, according to some embodiments.

Referring to FIG. 11, examples of a JT technique and wireless resource assignment per TRP depending on a situation are illustrated. In FIG. 11, a drawing 11-00 illustrates coherent-JT (C-JT) supporting coherent precoding between cells, TRPs, and/or beams. In C-JT, same data (PDSCH) is transmitted from a TRP A 11-05 and a TRP B 11-10, and a plurality of TRPs perform joint precoding. This may indicate that same DMRS ports for PDSCH reception are transmitted from the TRP A 11-05 and the TRP B 11-10 (for example, DMRS ports A and B are transmitted from both TRPs). In this case, a terminal may receive one piece of DCI for receiving one PDSCH modulated by the DMRS ports A and B.

In FIG. 11, a drawing 11-20 illustrates NC-JT supporting non-coherent precoding between cells, TRPs, and/or beams. In NC-JT, different PDSCHs are transmitted from the cells, TRPs, and/or beams, and individual precoding may be applied to each PDSCH. This may indicate that different DMRS ports for different PDSCH receptions are transmitted from a TRP A 11-25 and a TRP B 11-30 (for example, a DMRS port A is transmitted from TRP A and a DMRS port B is transmitted from TRP B). In this case, a terminal may receive two types of DCI for receiving a PDSCH A demodulated by the DMRS port A and a PDSCH B demodulated by the DMRS port B.

Figure 12:
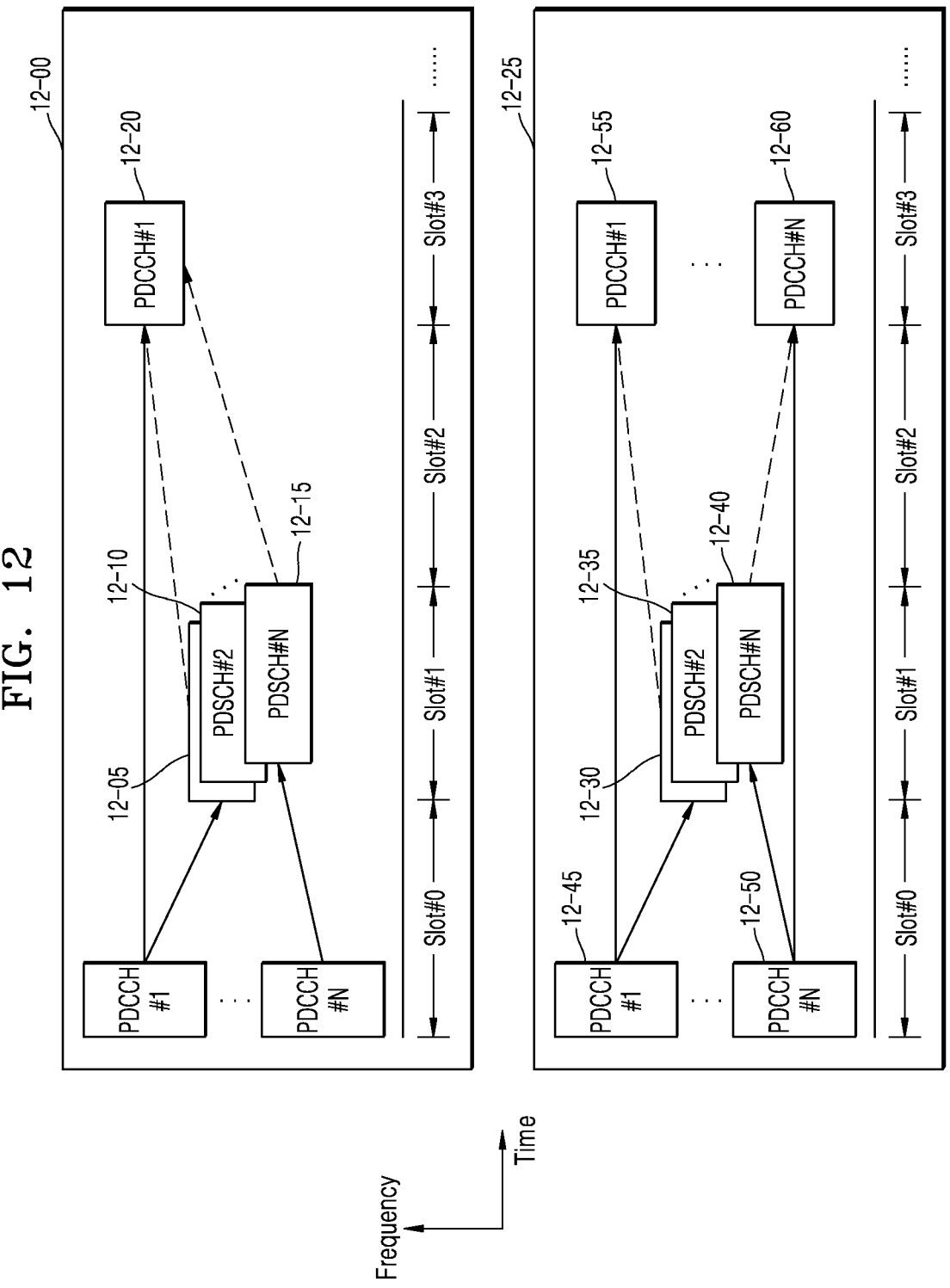
FIG. 12 is a diagram showing an example of cooperative communication PDSCH and PUCCH resource assignments and single or multiple PUCCH transmissions of an HARQ-ACK codebook for PDSCH, according to some embodiments.

FIG. 12 is a diagram showing an example of cooperative communication PDSCH and PUCCH resource assignments and single or multiple PUCCH transmissions of an HARQ-ACK codebook for PDSCH, according to some embodiments.

Referring to FIG. 12, an example in which HARQ-ACK codebooks for different PDSCHs transmitted from each cell, TRP, and/or beam are transmitted to a base station via single or a plurality of PUCCHs when NC-JT is applied is illustrated.

According to an embodiment, in a case 12-00 where the HARQ-ACK codebook is transmitted via single PUCCH, a terminal may configure, as one joint HARQ-ACK codebook, HARQ-ACK feedback bits for different PDSCHs 12-05, 12-10, and 12-15 transmitted from each cell, TRP, and/or beam, in one TRP, for example, a serving TRP used by the terminal for single PDSCH reception, and transmit the HARQ-ACK codebook via single PUCCH 12-20.

According to another embodiment, in a case 12-25 where the HARQ-ACK codebook is transmitted via a plurality of PUCCHs, the terminal may separately configure the HARQ-ACK codebooks for different PDSCHs 12-30, 12-35, and 12-40 transmitted from each cell, TRP, and/or beam, and separately perform transmission of PUCCHs 12-55 and 12-60 to a TRP that transmitted each PDSCH by using PUCCH resources indicated via pieces of DCI 12-45 and 12-50. Also, the terminal may configure, as one HARQ-ACK codebook, the HARQ-ACK feedback bits for the different PDSCHs 12-30, 12-35, and 12-40 transmitted from each cell, TRP, and/or beam, and perform transmission of the plurality of PUCCHs 12-55 and 12-60 to the TRPs that transmitted PDSCH by using PUCCH resources separately indicated via the pieces of DCI 12-45 and 12-50.

When the terminal configures, as one HARQ-ACK codebook, HARQ-ACK feedback bits for different PDSCHs transmitted from each cell, TRP, and/or beam, and transmits the HARQ-ACK codebook to the serving TRP via single PUCCH, the number of bits of the HARQ-ACK codebook may be increased and thus coverage of the PUCCH may be reduced and reception performance of the base station may deteriorate. In particular, when the terminal is instructed to configure a Type-1 HARQ-ACK codebook, the number of bits of the HARQ-ACK codebook may increase linearly in proportion to the number of TRPs because the HARQ-ACK feedback bits corresponding to the maximum PDSCHs transmittable from a slot location of a pre-determined timing are transmitted regardless of actual PDSCH transmission. Accordingly, when NC-JT is applied, it is required to carefully design the Type-1 HARQ-ACK codebook. In embodiments below, a HARQ-ACK feedback bit number reducing method and terminal instructing method when the terminal is instructed to configure the Type-1 HARQ-ACK codebook when NC-JT is applied will be described.

1-1st Embodiment: Method of Supporting Only PDSCH Mapping Type A

In NC-JT, only PDSCH mapping type A may be supported for different PDSCHs transmitted from each cell, TRP, and/or beam, and this may be indicated to a terminal via higher layer configuration. When only the PDSCH mapping type A is supported, the number of PDSCHs assignable within a limit where a symbol per slot does not overlap may be limited to 1. Accordingly, when the number of Type-1 HARQ-ACK codebook feedback bits is determined, the terminal may calculate the maximum number of PDSCHs transmittable via each TRP from a slot location corresponding to the NC-JT always to 1. Accordingly, the number of HARQ-ACK feedback bits of the slot corresponding to NC-JT may be reduced.

The HARQ-ACK feedback bits may be determined as below, according to an embodiment of the present disclosure. For example, [pseudo-code 1] described above may be replaced by [pseudo-code 4] below. When a set of PDSCH reception candidates in a serving cell c is $M_{A,c}$, the $M_{A,c}$ may be obtained via [pseudo-code 4] operations below.

[Start Pseudo-Code 4]

Operation 1: Initialize j to 0, $M_{A,c}$ to an empty set, and a HARQ-ACK transmission timing index k to 0.

Operation 2-1: Configure R as a set of rows in a table including information about the number or length of symbol, a start symbol, and a slot to which PDSCH is mapped. When a symbol to which a PDSCH indicated by each row of R is mapped is configured as an UL symbol according to higher layer configuration, the corresponding row is deleted from R.

Operation 2-2: When NC-JT is applied to a slot corresponding to k and only PDSCH mapping type A is supported for the case when NC-JT is applied according to higher layer configuration, a corresponding row is deleted from R when a PDSCH mapping type indicated by each row of R is B.

Operation 3-1: When the terminal is able to receive a PDSCH for unicast in one slot and R is not an empty set, add k to the set $M_{A,c}$.

Operation 3-2: When the terminal is able to receive more than one PDSCH in one slot, add j to $M_{A,c}$ while increasing j by 1 from the maximum number of PDSCHs assignable to different symbols in R.

Operation 4: Start from operation 2 by increasing k by 1.

[End Pseudo-Code 4]

Table 5 below may be an example of the table including the information about the number or length of symbol, the start symbol, and the slot to which PDSCH is mapped.

TABLE 5

PDSCH Resource Assignment Table

| Row index | dmrs-TypeA-Postion | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |

TABLE 5-continued

PDSCH Resource Assignment Table

| Row index | dmrs-TypeA-Postion | PDSCH mapping type | $K_0$ | S | L |
|---|---|---|---|---|---|
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2.3 | Type B | 0 | 5 | 7 |
| 9 | 2.3 | Type B | 0 | 5 | 2 |
| 10 | 2.3 | Type B | 0 | 9 | 2 |
| 11 | 2.3 | Type B | 0 | 12 | 2 |
| 12 | 2.3 | Type A | 0 | 1 | 13 |
| 13 | 2.3 | Type A | 0 | 1 | 6 |
| 14 | 2.3 | Type A | 0 | 2 | 4 |
| 15 | 2.3 | Type B | 0 | 4 | 7 |
| 16 | 2.3 | Type B | 0 | 8 | 4 |

According to Table 5, when both PDSCH mapping type A and PDSCH mapping type B are considered, up to 3 PDSCHs may be assigned to one slot, and when only PDSCH mapping type A is considered, up to 1 PDSCH may be assigned to one slot.

According to the current embodiment, the number of HARQ-ACK feedback bits of the slot corresponding to NC-JT may be reduced, but the degree of freedom for PDSCH assignment may be reduced due to a limitation to the location and number of symbols assigned in a slot because a PDSCH mapping type of NC-JT is limited. Accordingly, in an embodiment below, a method of reducing the number of Type-1 HARQ-ACK codebook bits while not reducing the degree of freedom for PDSCH assignment will be described.

1-2nd Embodiment: Method of Supporting HARQ-ACK Slot-Level Bundling

Each TRP may not assign 2 or more PDSCHs to one slot and indicate the terminal to configure the Type-1 HARQ-ACK codebook by reducing the number of bits by bundling HARQ-ACK feedback bits corresponding to a PDSCH transmittable from a slot corresponding to NC-JT. When the terminal is instructed to configure the Type-1 HARQ-ACK codebook, the number of HARQ-ACK bits may be determined by the maximum number of PDSCHs transmittable from one slot, according to the table including the information about the number or lengths of symbols, the start symbol, and the slot to which PDSCH is mapped, and the terminal may determine HARQ-ACK information of a corresponding bit to NACK for a PDSCH that is not transmitted. When the terminal is indicated to apply a binary OR operation on the HARQ-ACK information corresponding to one slot, the terminal may determine the HARQ-ACK information to ACK when a PDSCH received from each TRP is present in the corresponding slot and determine the HARQ-ACK to NACK when the PDSCH is not present. Accordingly, when two or more PDSCHs are not assigned to one slot by each TRP, the number of HARQ-ACK bits is determined by the maximum number of PDSCHs according to the table including the information about the number of lengths of symbols, the start symbol and the slot to which PDSCH is mapped for each TRP, and thus the number of bits of Type-1 HARQ-ACK codebook may be reduced by preventing unnecessary NACK information from being transmitted. In the current embodiment, the degree of freedom for PDSCH assignment is not reduced because a PDSCH mapping type is not limited, but like 1-1st Embodiment, the number of PDSCHs assigned to one slot by each TRP may be limited to 1.

The HARQ-ACK feedback bits may be determined as below, according to an embodiment of the present disclosure. For example, [pseudo-code 1] described above may be replaced by [pseudo-code 5] below. When a set of PDSCH reception candidates in a serving cell c is $M_{A,c}$, the $M_{A,c}$ may be obtained via [pseudo-code 5] operations below.

[Start Pseudo-Code 5]

Operation 1: Initialize j to 0, $M_{A,c}$ to an empty set, and a HARQ-ACK transmission timing index k to 0.

Operation 2: Configure R as a set of rows in the table including the information about the number or lengths of symbols, the start symbol, and the slot to which PDSCH is mapped. When a symbol to which a PDSCH indicated by each row of R is mapped is configured as an UL symbol according to higher layer configuration, the corresponding row is deleted from R.

Operation 3-1: When the terminal is able to receive a PDSCH for unicast in one slot and R is not an empty set, add k to the set $M_{A,c}$.

Operation 3-2: When the terminal is able to receive more than one PDSCH in one slot and the slot does not correspond to NC-JT, count the maximum number of PDSCHs assignable to different symbols in R and add the corresponding number of j to $M_{A,c}$ while increasing j by 1.

Operation 3-3: When the terminal is able to receive more than one PDSCH in one slot, the slot corresponds to NC-JT, and slot-level bundling is not configured for the slot corresponding to NC-JT via higher layer signaling, count the maximum number of PDSCHs assignable to different symbols in R and add the corresponding number of j to $M_{A,c}$ while increasing j by 1.

Operation 3-4: When the terminal is able to receive more than one PDSCH in one slot, the slot corresponds to NC-JT, and slot-level bundling is configured for the slot corresponding to NC-JT via higher layer signaling, add j to $M_{A,c}$ and increase j by 1.

Operation 4: Start from operation 2 by increasing k by 1.

[End Pseudo-Code 5]

When the slot-level bundling is configured for the slot corresponding to NC-JT via higher layer signaling in [pseudo-code 5], only one j may be added to $M_{A,c}$ for the slot corresponding to NC-JT so as to obtain a same result as applying, by the terminal, a binary OR operation to the HARQ-ACK information for PDSCH transmittable from one TRP to the slot.

Meanwhile, by expanding the current embodiment, HARQ-ACK slot-level bundling for one TRP, for example, a serving TRP used by the terminal to receive single PDSCH, and HARQ-ACK slot-level bundling for remaining TRPs excluding the corresponding TRP may be differently configured. For example, when HARQ-ACK slot-level bundling is configured for all TRPs via higher layer signaling and HARQ-ACK slot-level bundling for all TRPs is indicated, HARQ-ACK slot-level bundling for a serving TRP may be separately indicated via another higher layer signaling.

Figure 13:
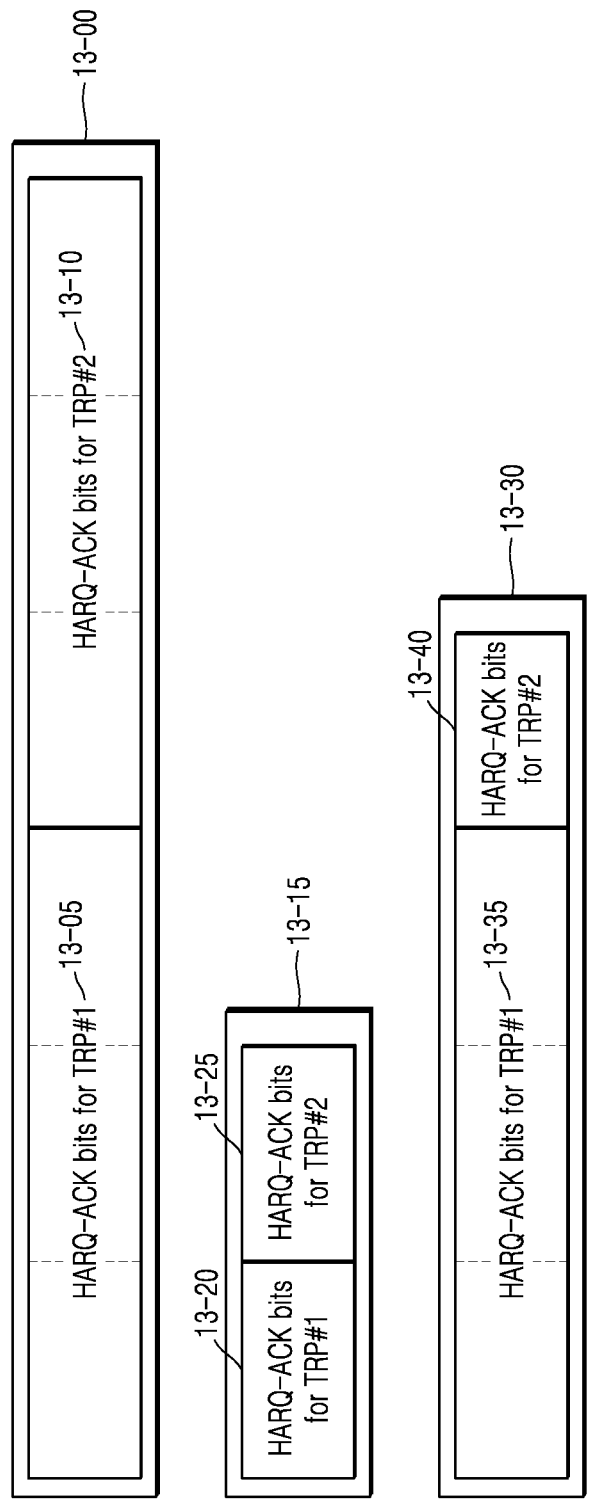
FIG. 13 is a diagram showing a configuration example of a Type-1 HARQ-ACK codebook according to HARQ-ACK slot-level bundling, according to some embodiments.

FIG. 13 is a diagram showing a configuration example of a Type-1 HARQ-ACK codebook according to HARQ-ACK slot-level bundling, according to some embodiments.

Referring to FIG. 13, three examples of Type-1 HARQ-ACK codebook when HARQ-ACK slot-level bundling for all TRPs and HARQ-ACK slot-level bundling for a serving TRP are separately indicated are illustrated.

In FIG. 13, a case #1 13-00 shows a Type-1 HARQ-ACK codebook when HARQ-ACK slot-level bundling for all TRPs is not instructed. Accordingly, HARQ-ACK feedback bits 13-05 and 13-10 for respective TRPs may be included by the maximum number of PDSCHs transmittable from one slot, according to the table including the information about the number or lengths of symbols, the start symbol, and the slot to which PDSCH is mapped. The number of PDSCHs transmittable to one slot from each TRP is not limited, but the number of HARQ-ACK feedback bits increases linearly according to the number of TRPs.

In FIG. 13, a case #2 13-15 shows a Type-1 HARQ-ACK codebook when HARQ-ACK slot-level bundling for all TRPs is instructed and HARQ-ACK slot-level bundling for a serving TRP is instructed. The number of PDSCHs transmittable to one slot from each TRP is limited to 1, and HARQ-ACK feedback bits 13-20 and 13-25 may be determined according to whether PDSCH transmitted to the slot is received. Although the number of PDSCHs transmittable to the slot from all TRPs is limited to 1, but the number of HARQ-ACK feedback bits is reduced to 1 per TRP in the slot, and thus the number of HARQ-ACK feedback bits is reduced.

In FIG. 13, a case #3 13-30 shows a Type-1 HARQ-ACK codebook when HARQ-ACK slot-level bundling for all TRPs is instructed and HARQ-ACK slot-level bundling for a serving TRP is not instructed. HARQ-ACK feedback bits 13-35 for the serving TRP may be included by the maximum number of PDSCHs transmittable from one slot according to the table including the information about the number or lengths of symbols, the start symbol, and the slot to which PDSCH is mapped, and HARQ-ACK feedback bits 13-40 for a cooperative TRP may be bundled and included. Accordingly, the number of PDSCHs transmittable to one slot is not limited for the serving TRP, and the number of PDSCHs transmittable to one slot may be limited to 1 for the cooperative TRP. In this case, PDSCH assignment is not limited for the serving TRP and the number of HARQ-ACK feedback bits for the remaining TRPs may be reduced.

1-3rd Embodiment: Method of Limiting Number of HARQ-ACK Feedback Bits Per Slot The current embodiment shows a method of limiting the number of HARQ-ACK feedback bits corresponding to each slot, and accordingly limiting the number of PDSCHs transmittable to one slot of a serving TRP or cooperative TRP to 1. Accordingly, maximum PDSCH assignment may be instructed per slot by each TRP according to the number of HARQ-ACK feedback bits limited by the base station. The number of HARQ-ACK feedback bits limited by the base station may be determined, for example, according to coverage of PUCCH where the HARQ-ACK codebooks is transmitted.

The number of TRPs assigning a PDSCH to one slot in the serving cell c may be denoted as N and the maximum number of PDSCHs transmittable from one slot according to the table including the information about the number or lengths of symbols, the start symbol, and the slot to which PDSCH is mapped, may be denoted as maxNrofPDCCHs. When HARQ-ACK bundling for a codeword is not instructed via higher layer signaling but up to 2 codewords are instructed to be receivable via one PDSCH, the number of HARQ-ACK feedback bits corresponding to one slot may be expressed by N×maxNrofPDCCHs×2. Also, when HARQ-ACK bundling for a codeword is instructed via higher layer signaling and up to 2 codewords are not instructed to be receivable via one PDSCH, the number of HARQ-ACK feedback bits corresponding to one slot may be expressed by N×maxNrofPDCCHs. This may limit the maximum number of PDSCHs assigned to one slot by each TRP to the number of HARQ-ACK feedback bits when maxNrofPDCCHs is assumed, for example, limit the maximum number of PDSCHs assigned to one slot by each TRP to 1 when the number of HARQ-ACK feedback bits corresponding to one slot is limited to be smaller than maxNrofPDCCHs. For example, when HARQ-ACK bundling for codeword is instructed via higher layer signaling or up to 2 codewords are not instructed to be receivable via one PDSCH, the maximum number of PDSCHs assigned to one slot by the cooperative TRP excluding the serving TRP may be limited to 1 such as to reduce the number of HARQ-ACK feedback bits corresponding to one slot to maxNrofPDCCHs+N−1 when the number N×maxNrofPDCCHs of HARQ-ACK feedback bits corresponding to one slot is greater than a limited value for the HARQ-ACK feedback bits corresponding to one slot. When the corresponding number maxNrofPDCCHs+N−1 of HARQ-ACK feedback bits is greater than the limited value for the HARQ-ACK feedback bits corresponding to one slot, the maximum number of PDSCHs assigned to one slot by the serving TRP may be limited to 1 to reduce the number of HARQ-ACK feedback bits corresponding to one slot to N.

Table 6 below may be an example of a table including information about whether the maximum number of PDSCHs assigned to one slot per TRP according to the number of HARQ-ACK feedback bits is limited, when the limited value for the number of HARQ-ACK feedback bits corresponding to one slot is denoted by K, and when HARQ-ACK bundling for codeword is not instructed via higher layer signaling and up to two codewords are instructed to be receivable via one PDSCH.

freedom for PDSCH assignment may be considered together by determining the maximum number of PDSCHs assigned to one slot for the serving TRP or remaining TRP such that the limited value of the number of HARQ-ACK feedback bits corresponding to one slot is not exceeded.

Second Embodiment: HARQ-ACK Codebook Combining for Multi-PUCCH for NC-JT

When NC-JT is applied, the terminal may transmit HARQ-ACK codebooks for different PDSCHs transmitted from each cell, TRP, and/or beam to the base station via single or a plurality of PUCCHs. When the terminal is to transmit the HARQ-ACK codebook via the plurality of PUCCHs, a plurality of PUCCH transmissions may be supported by instructing different PUCCH resources in DCI assigning PDSCH transmitted from a plurality of TRPs.

Figure 14:
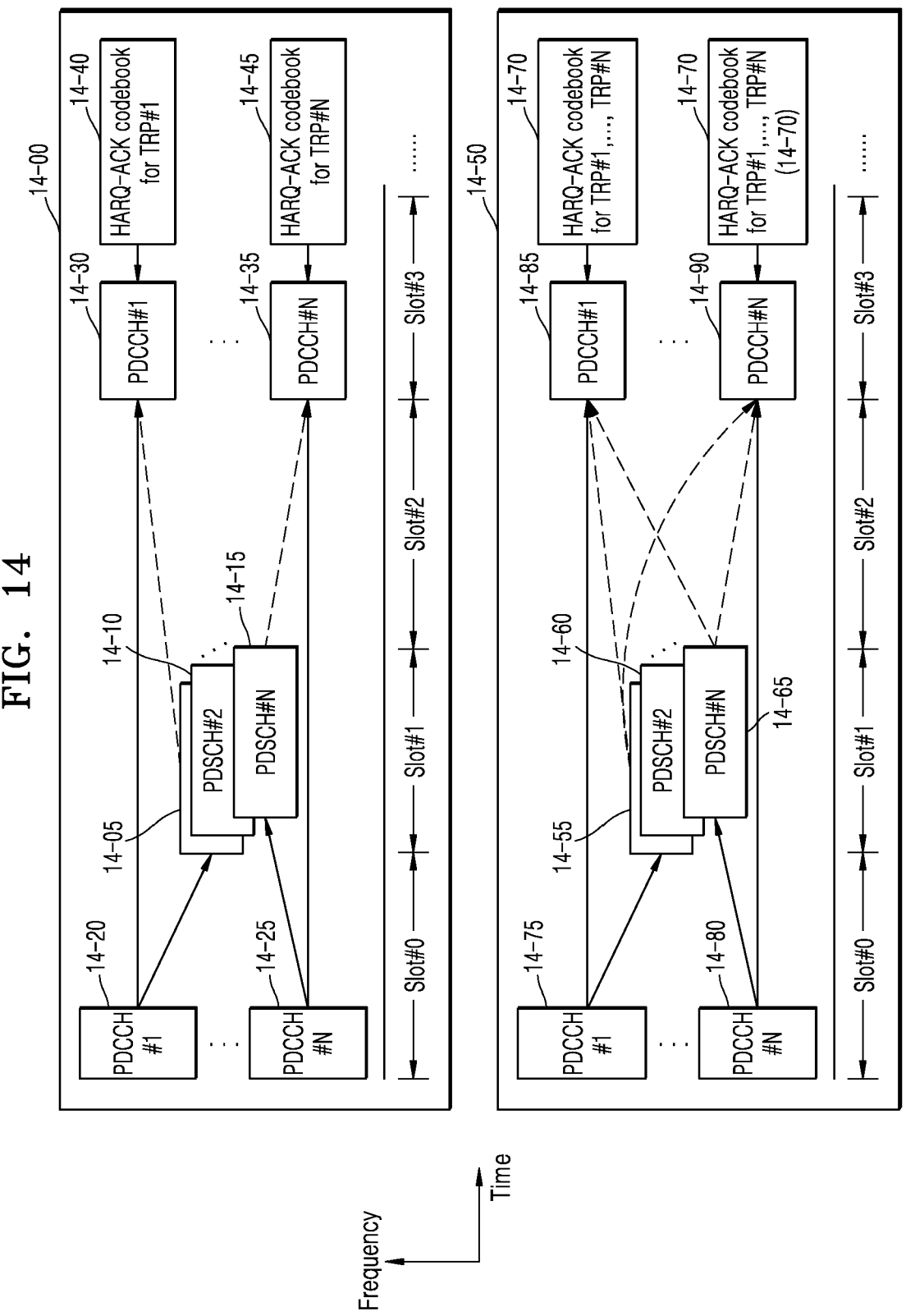
FIG. 14 is a diagram showing a configuration example of an HARQ-ACK codebook when the HARQ-ACK codebook is transmitted via a plurality of PUCCHs, according to some embodiments.

FIG. 14 is a diagram showing an example of a method of configuring an HARQ-ACK codebook when the HARQ-ACK codebook is transmitted via a plurality of PUCCHs, according to some embodiments.

In FIG. 14, a case #1 14-00 illustrates an example of configuring HARQ-ACK codebooks separately for different PDSCHs 14-05, 14-10, and 14-15 transmitted from each cell, TRP, and/or beam. PUCCH 14-30 and 14-35 may be separately transmitted to a TRP that transmitted each PDSCH by using PUCCH resources instructed via pieces of DCI 14-20 and 14-25. In this case, HARQ-ACK codebooks 14-40 and 14-45 are transmitted to respective TRPs and thus the number of HARQ-ACK codebook bits may be prevented from increasing linearly according to the number of TRPs.

TABLE 6

| Condition for limited value K of number of HARQ-ACK feedback bits | Maximum number of PDSCHs assigned to one slot by serving TRP | Maximum number of PDSCHs assigned to one slot by cooperative TRP | Number of HARQ-ASK feedback bits coresponding to one slot |
| --- | --- | --- | --- |
| 2 × N × maxNrofPDCCHs ≤ K | maxNrofPDCCHs | maxNrofPDCCHs | 2 × N × maxNrofPDCCHs |
| 2 · (maxNrofPDCCHs + N − 1) ≤ K ≤ 2 × N × maxNrofPDCCHs | maxNrofPDCCHs | 1 | 2 · (maxNrofPDCCHs + N − 1) |
| K ≤ 2 · (maxNrofPDCCHs + N − 1) | 1 | 1 | 2 × N |

Table 7 may be an example of a table including information about whether the maximum number of PDSCHs assigned to one slot per TRP according to the number of HARQ-ACK feedback bits is limited, when the limited value for the number of HARQ-ACK feedback bits corresponding to one slot is denoted by K, and when HARQ-ACK bundling for codeword is instructed via higher layer signaling and up to two codewords are not instructed to be receivable via one PDSCH.

In FIG. 14, a case #2 14-50 illustrates an example of configuring, as one HARQ-ACK codebook 14-70, HARQ-ACK feedback bits for different PDSCHs 14-55, 14-60, and 14-65 transmitted from each cell, TRP, and/or beam. In this case, one joint HARQ-ACK codebook 14-70 may be configured by combining HARQ-ACK codebooks corresponding to the TRPs, and transmitted to all TRPs via PUCCH 14-85 and 14-90 by using PUCCH resources separately

TABLE 7

| Condition for limited value K of number of HARQ-ACK feedback bits | Maximum number of PDSCHs assigned to one slot by serving TRP | Maximum number of PDSCHs assigned to one slot by cooperative TRP | Number of HARQ-ASK feedback bits coresponding to one slot |
| --- | --- | --- | --- |
| N × maxNrofPDCCHs ≤ K | maxNrofPDCCHs | maxNrofPDCCHs | N × maxNrofPDCCHs |
| maxNrofPDCCHs + N − 1 ≤ K ≤ N × maxNrofPDCCHs | maxNrofPDCCHs | 1 | maxNrofPDCCHs + N − 1 |
| K ≤ maxNrofPDCCHs + N − 1 | 1 | 1 | N |

According to Tables 6 and 7 described above, the number of bits of Type-1 HARQ-ACK codebook and the degree of indicated via pieces of DCI 14-75 and 14-80, thereby increasing reliability of HARQ-ACK feedback.

In embodiments below, a method of separately configuring an HARQ-ACK codebook for each TRP when transmitting the HARQ-ACK codebook via a plurality of PUCCHs when NC-JT is applied, and a method of configuring an HARQ-ACK codebook by combining for all TRPs will be described, and a method of instructing a terminal will be described.

2-1st Embodiment: Method of Configuring Via Higher Layer Signaling

When HARQ-ACK feedback bits for PDSCHs transmitted from a plurality of cooperative TRPs are to be transmitted to a plurality of PTRs via individual PUCCH resource instructions, it is possible to separately configure HARQ-ACK codebooks corresponding to each TRP or combine and configure a joint HARQ-ACK codebook for all TRPs. The base station may instruct the terminal of a method of configuring an HARQ-ACK codebook via higher layer signaling.

When the base station instructs the terminal to separately configure the HARQ-ACK codebooks corresponding to each TRP via higher layer signaling, the terminal may generate the HARQ-ACK codebook corresponding to each TRP and transmit the HARQ-ACK codebook via a PUCCH resource indicated by DCI transmitted from the TRP. For example, when the terminal is instructed to configure Type-1 HARQ-ACK codebook, the terminal may determine HARQ-ACK codebook bits based on HARQ-ACK feedback information about PDSCH assigned by DCI indicating a same PUCCH resource. When the terminal is instructed to configure Type-2 HARQ-ACK codebook, the terminal may determine HARQ-ACK codebook bits via [pseudo-code 3] described above based on HARQ-ACK feedback information about PDSCH assigned by DCI indicating a same PUCCH resource, based on counter DAI and total DAI of the DCI indicating the same PUCCH resource.

When the base station instructs the terminal to combine and configure the joint HARQ-ACK codebook for all TRPs via higher layer signaling, the terminal may determine a slot to which PUCCH for transmitting HARQ-ACK feedback bits is assigned, via a PDSCH-to-HARQ_feedback timing indicator indicating a slot interval between PDSCH indicated by the DCI transmitted from each TRP and corresponding HARQ-ACK feedback. Also, the terminal may determine the HARQ-ACK codebook bits based on HARQ-ACK feedback information about PDSCH indicated by DCI assigning PUCCH assigned to a same slot. For example, when the terminal is instructed to configure the Type-1 HARQ-ACK codebook, the terminal may configure the HARQ-ACK codebook via [pseudo-code 1] and [pseudo-code 2] described above. When the PUCCH resources indicated by the DCI assigning the PUCCH assigned to the same slot are different from each other, individual HARQ-ACK codebooks may be configured based on the PUCCH resources and then concatenated to form the HARQ-ACK codebook for all TRPs. When the terminal is instructed to configure the Type-2 HARQ-ACK codebook, the terminal may determine the HARQ-ACK codebook bits based on counter DAI and total DAI of DCI assigning the PUCCH assigned to the same slot.

2-2nd Embodiment: Method of Following Symbol-Level Overlapping

When the terminal is able to transmit a plurality of PUCCHs to which at least one same symbol is assigned in one slot, an HARQ-ACK codebook corresponding to each TRP may be set to be separately configured or an HARQ-ACK codebook for all TRPs may be set to be combined and configured, depending on symbol-level overlapping of a plurality of assigned PUCCH resources. The symbol-level overlapping of the plurality of PUCCH resources may indicate that at least one same symbol may be included among symbols in a slot to which PUCCH resources are assigned. For example, it may be configured to configure a joint HARQ-ACK codebook for PDSCH assigned by corresponding DCI when PUCCH resources indicated by the DCI transmitted by the plurality of TRPs are symbol-level overlapped for the plurality of PUCCHs assigned by the plurality of TRPs to one slot for HARQ-ACK feedback for PDSCH. Also, it may be configured to configure HARQ-ACK codebook separately for the PDSCH assigned by DCI transmitted by each TRP and PUCCH transmission may be performed via a corresponding PUCCH resource when the PUCCH resource indicated by the DCI transmitted by the plurality of TRPs are not symbol-level overlapped for the plurality of PUCCHs assigned by the plurality of TRPs to one slot for HARQ-ACK feedback for PDSCH.

Figure 15:
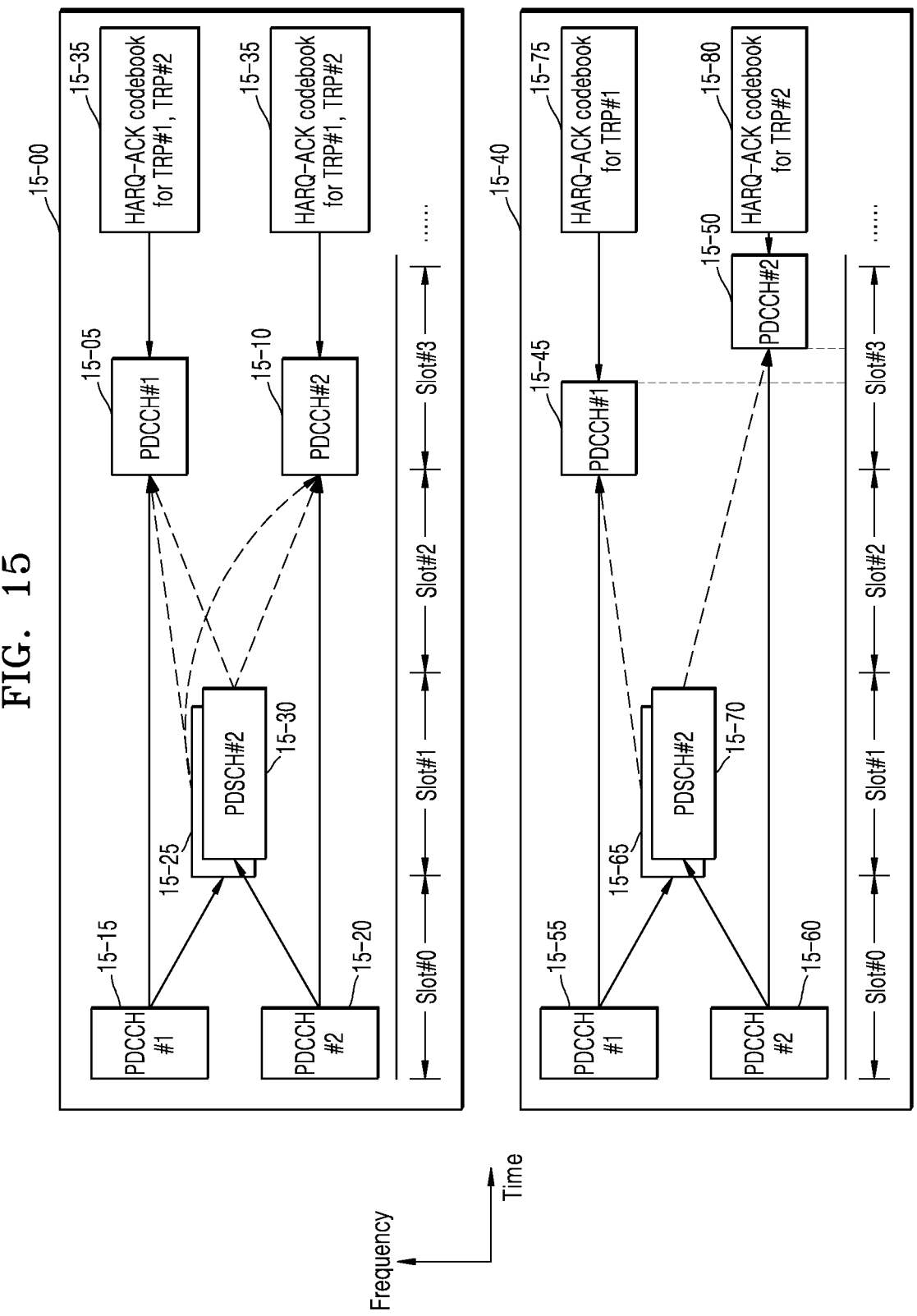
FIG. 15 is a diagram showing an example of a method of configuring an HARQ-ACK codebook according to symbol-level overlapping of a plurality of PUCCH resources, according to some embodiments.

FIG. 15 is a diagram showing an example of a method of configuring an HARQ-ACK codebook according to symbol-level overlapping of a plurality of PUCCH resources, according to some embodiments.

Referring to FIG. 15, two examples of separately configuring an HARQ-ACK codebook corresponding to each TRP or combining and configuring an HARQ-ACK codebook for all TRPs depending on symbol-level overlapping of a plurality of PUCCH resources are illustrated.

In FIG. 15, a case #1 15-00 shows an example of combining and configuring an HARQ-ACK codebook 15-35 for PDSCHs 15-25 and 15-30 assigned by corresponding DCI by symbol-level overlapping PUCCH resources indicated by pieces of DCI 15-15 and 15-20 transmitted by a plurality of TRPs for a plurality of PUCCHs 15-05 and 15-10 assigned to one slot. Because PUCCH resources indicated by DCI assigning a PUCCH assigned to a same slot are different from each other, individual HARQ-ACK codebooks may be configured based on the PUCCH resources and then the HARQ-ACK codebook 15-35 obtained by concatenating the individual HARQ-ACK codebooks may be transmitted to each TRP.

In FIG. 15, a case #2 15-40 shows an example of not symbol-level overlapping PUCCH resources indicated by pieces of DCI 15-55 and 15-60 transmitted from a plurality of TRPs for a plurality of PUCCHs 15-45 and 15-50 assigned to one slot. The terminal may transmit an HARQ-ACK codebook via PUCCH resources indicated by DCI transmitted from each TRP by generating HARQ-ACK codebooks 15-75 and 15-80 for PDSCHs 15-65 and 15-70 assigned by the DCI transmitted from each TRP.

When transmission of a plurality of PUCCHs to which at least one same symbol is assigned in one slot is not supported, the terminal may perform one PUCCH transmission by including all pieces of information corresponding to the plurality of PUCCHs. The terminal may configure one joint HARQ-ACK codebook by combining HARQ-ACK codebooks transmitted to the plurality of PUCCHs to which at least one same symbol is assigned. The terminal may transmit the configured one HARQ-ACK codebook via one PUCCH, for example, a PUCCH resource assigned by a serving TRP.

2-3rd Embodiment: Method by which One PDCCH Supports Plurality of PUCCH Assignments In NC-JT, the terminal may receive PDSCH assignment information for all TRPs via DCI transmitted from a serving TRP. A plurality of PUCCH resource assignments may be supported via the DCI transmitted from the serving TRP may be supported such that each TRP separately receives HARQ-ACK feedback for a PDSCH transmitted from the plurality of TRPs. In particular, the DCI transmitted from the serving TRP may configure the PUCCH resources to be transmitted to the TRPs for PDSCH cooperative communication, and the terminal may configure an HARQ-ACK codebook for the PDSCH transmitted from all TRPs and separately transmit HARQ-ACK feedback bits via the PUCCH resources configured per TRP. Here, the HARQ-ACK codebooks may be separately configured for the PDSCH transmitted from all TRPs or the HARQ-ACK codebooks for all TRPs may be combined and configured, and the method described in 2-1st Embodiment or 2-2nd Embodiment of the present disclosure may be used.

Table 8 below may be an example of a table for configuring PUCCH resources to be transmitted from DCI transmitted from a serving TRP to TRPs for PDSCH cooperative communication. To configure the plurality of PUCCH resources in single piece of DCI, a PUCCH resource indicator for individual TRP may be defined and the PUCCH resource indicator corresponding to each TRP may indicate a PUCCH resource to be transmitted to the TRP. According to the current embodiment, the degree of freedom for PUCCH resource assignment may be increased because the PUCCH resources for all TRPs are separately instructed, but the number of bits corresponding to the PUCCH resource indicator may be increased in the DCI.

TABLE 8

| $1^{st}$ PUCCH resource indicator | $2^{nd}$ PUCCH resource indicator | $1^{st}$ PUCCH resource | $2^{nd}$ PUCCH resource |
|---|---|---|---|
| 000 | 000 | $1^{st}$ resource in PUCCH resource set | $1^{st}$ resource in PUCCH resource set |
|  | 001 |  | $2^{nd}$ resource in PUCCH resource set |
|  | ... |  | ... |
|  | 111 |  | $8^{th}$ resource in PUCCH resource set |
| ... | ... | ... | ... |
| 111 | 000 | $8^{th}$ resource in PUCCH resource set | $1^{st}$ resource in PUCCH resource set |
|  | 001 |  | $2^{nd}$ resource in PUCCH resource set |
|  | ... |  | ... |
|  | 111 |  | $8^{th}$ resource in PUCCH resource set |

In the above example, when a plurality of PUCCH resource indicators indicate a same PUCCH resource, the terminal may transmit an HARQ-ACK codebook for a PDSCH transmitted from a TRP corresponding to the PUCCH resource indicator indicating the same PUCCH resource via one PUCCH resource commonly indicated by the PUCCH resource indicator.

Table 9 below may be an example of a table for configuring PUCCH resources to be transmitted from DCI transmitted from a serving TRP to TRPs for PDSCH cooperative communication. To configure a plurality of PUCCH resources in single piece of DCI, the number of PUCCH resources included in a PUCCH resource set may be increased according to the number of cooperative TRPs, and single code point of a PUCCH resource indicator may indicate the plurality of PUCCH resources to be transmitted to all TRPs. According to the current embodiment, the number of PUCCH resource sets transmitted to the terminal via higher layer signaling may be increased, but the plurality of PUCCH resources may be indicated while maintaining the number of bits corresponding to the PUCCH resource indicator in the DCI like a case when single PUCCH resource is indicated.

TABLE 9

| PUCCH resource indicator | PUCCH resource |
|---|---|
| 000 | $1^{st}$ resource in PUCCH resource set, $9^{th}$ resource in PUCCH resource set |
| 001 | $2^{nd}$ resource in PUCCH resource set, $10^{th}$ resource in PUCCH resource set |
| ... | ... |
| 111 | $8^{th}$ resource in PUCCH resource set, $16^{th}$ resource in PUCCH resource set |

2-4th Embodiment: Method of Supporting Plurality of PUCCH Transmissions Via Plurality of PDCCHs As an example of NC-JT transmission, the terminal may receive resource assignment information for PDSCHs transmitted from the cooperative TRPs via DCI or different PDCCHs transmitted from cooperative TRPs. Here, it is required for TRPs to separately receive, via a plurality of PUCCHs, HARQ-ACK feedback for the PDSCHs transmitted from the cooperative TRPs, in consideration of backhaul delay (non-ideal backhaul) between the TRPs. In this regard, when the NC-JT transmission is instructed via a plurality of PDCCHs or a plurality of pieces of DCI, it may be possible to guarantee PUCCH resource indicators indicating PUCCH resource assignment information where HARQ-ACK feedback in each piece of DCI is to be transmitted to have different values. In other words, during multi-DCI-based NC-JT transmission, each cooperative TRP may perform HARQ ACK/NACK feedback via individual PUCCH resources, and the terminal may not expect each cooperative TRP to indicate a same PUCCH resource indicator value during NC-JT transmission. In this case, HARQ-ACK codebooks for PDSCHs transmitted from the cooperative TRPs may be separately configured and transmitted via respective PUCCH resources. That is, the terminal may not expect the HARQ-ACK codebooks for the PDSCHs transmitted from the cooperative TRPs to be combined and configured.

With respect to assigning of different PUCCH resources per TRP, a restriction on the PUCCH resource indication may vary depending on whether the terminal has multi-panel support or multi-beam simultaneous transmission capability (or depending on UE capability support). For example, when the terminal simultaneously supports multi-panel/beam transmission or spatial relation/TCI state configuration during UL transmission, the terminal may be configured such that the PUCCHs to be transmitted to the cooperative TRPs have different panel/beam/spatial relation/TCI state in a same OFDM symbol. On the other hand, when the terminal does not support multi-panel/beam transmission or spatial relation/TCI state configuration, the terminal may not expect to be configured such that the PUCCHs to be transmitted to the cooperative TRPs have different panel/beam/spatial relation/TCI state in a same OFDM symbol. When the terminal that does not support the multi-panel/beam transmission or spatial relation/TCI state configuration is instructed with different PUCCH resources for NC-JT in a same OFDM symbol, the terminal may not follow the PUCCH transmission operation per TRP above, but may report integrated information via single PUCCH resource according to an ACK/NACK feedback combined method of 2-2nd Embodiment or the like. Here, the single PUCCH resource may be determined according to a pre-determined priority, for example, a priority of PDCCH or PDSCH resources associated with the different PUCCH resources.

A detailed configuration method for the HARQ-ACK codebook for the PDSCH transmitted from the cooperative TRP may follow the method described in the above embodiments.

All embodiments of the present disclosure above have been described based on the HARQ-ACK codebook transmitted on the PUCCH resource for convenience of descriptions, but may be identically applied to an HARQ-ACK codebook transmitted by being multiplexed to a PUSCH resource. Also, all embodiments of the present disclosure above have been described based on PUCCH resources including only uplink control information (UCI) for HARQ-ACK codebook transmission for convenience of description, but may be identically applied to PUCCH resources including UCI for scheduling request (SR) or channel state information (CSI) and UCI for HARQ-ACK codebook transmission.

Figure 16:
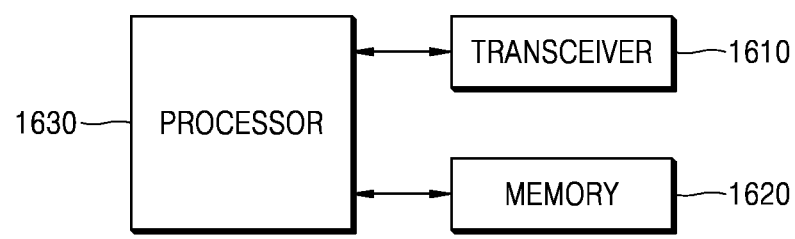
FIG. 16 is a block diagram of a structure of a terminal, according to some embodiments.

FIG. 16 is a block diagram of a structure of a terminal, according to some embodiments.

Referring to FIG. 16, the terminal may include a transceiver 1610, a memory 1620, and a processor 1630. The transceiver 1610, the memory 1620, and the processor 1630 of the terminal may operate according to a communication method of the terminal described above. However, the components of the terminal are not limited thereto. For example, the terminal may include more or fewer components than those described above. In addition, the transceiver 1610, the memory 1620, and the processor 1630 may be implemented as a single chip.

The transceiver 1610 may transmit or receive a signal to or from a base station. Here, the signal may include control information and data. In this regard, the transceiver 1610 may include a RF transmitter for up-converting and amplifying a frequency of a transmitted signal, and a RF receiver for amplifying low-noise and down-converting a frequency of a received signal. However, this is only an example of the transceiver 1610 and components of the transceiver 1610 are not limited to the RF transmitter and the RF receiver.

Also, the transceiver 1610 may receive and output, to the processor 1630, a signal through a wireless channel, and transmit a signal output from the processor 1630 through the wireless channel.

The memory 1620 may store a program and data required for operations of the terminal. Also, the memory 1620 may store control information or data included in a signal obtained by the terminal. The memory 1620 may be a storage medium, such as read-only memory (ROM), random access memory (RAM), a hard disk, a CD-ROM, and a DVD, or a combination of storage media.

The processor 1630 may control a series of processes such that the terminal operates as described above. According to some embodiments, the processor 1630 may control the components of the terminal to receive a plurality of PDSCHs simultaneously by receiving DCI including two layers.

Figure 17:
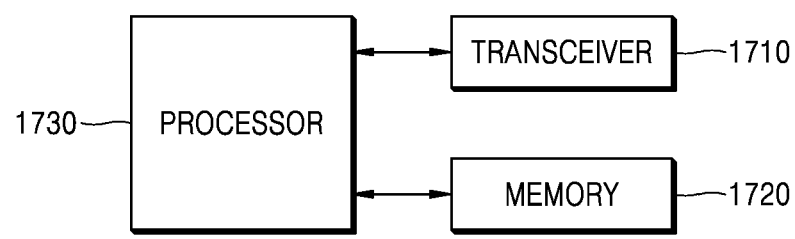
FIG. 17 is a block diagram of a structure of a base station, according to some embodiments.

FIG. 17 is a block diagram of a structure of a base station, according to some embodiments.

Referring to FIG. 17, the base station may include a transceiver 1710, a memory 1720, and a processor 1730. The transceiver 1710, the memory 1720, and the processor 1730 of the base station may operate according to a communication method of the base station described above. However, the components of the base station are not limited thereto. For example, the base station may include more or fewer components than those described above. In addition, the transceiver 1710, the memory 1720, and the processor 1730 may be implemented as a single chip.

The transceiver 1710 may transmit or receive a signal to or from a terminal. Here, the signal may include control information and data. In this regard, the transceiver 1710 may include a RF transmitter for up-converting and amplifying a frequency of a transmitted signal, and a RF receiver for amplifying low-noise and down-converting a frequency of a received signal. However, this is only an example of the transceiver 1710 and components of the transceiver 1710 are not limited to the RF transmitter and the RF receiver.

Also, the transceiver 1710 may receive and output, to the processor 1730, a signal through a wireless channel, and transmit a signal output from the processor 1730 through the wireless channel.

The memory 1720 may store a program and data required for operations of the base station. Also, the memory 1720 may store control information or data included in a signal obtained by the base station. The memory 1720 may be a storage medium, such as ROM, RAM, a hard disk, a CD-ROM, and a DVD, or a combination of storage media.

The processor 1730 may control a series of processes such that the base station operates as described above. According to some embodiments, the processor 1730 may control each component of the base station to configure and transmit two layers of DCI including assignment information for a plurality of PDSCHs.

Meanwhile, the embodiments of the present disclosure described with reference to the present specification and the drawings are merely illustrative of specific examples to easily facilitate description and understanding of the present disclosure, and are not intended to limit the scope of the present disclosure. In other words, it will be apparent to one of ordinary skill in the art that other modifications based on the technical ideas of the present disclosure are feasible. Also, the embodiments may be combined with each other as required. For example, a portion of one embodiment and a portion of another embodiment of the present disclosure may be combined with each other to enable a base station and a terminal to operate.

The invention claimed is:

1. A method, performed by a user equipment (UE), in a wireless communication system, the method comprising:
receiving, from a first transmit/receive point (TRP), downlink control information (DCI) in a physical downlink control channel (PDCCH), for a first physical downlink shared channel (PDSCH) and a second PDSCH, wherein the DCI is associated with the first TRP and a second TRP;
based on the DCI from the first TRP, determining a first physical uplink control channel (PUCCH) resource and a second PUCCH resource;
determining whether symbol-level overlapping exists between the first PUCCH resource and the second PUCCH resource;
in case that at least one symbol in a slot allocated to the first PUCCH resource does not overlap with at least one symbol in a slot allocated to the second PUCCH resource, generating a first HARQ-ACK codebook and a second HARQ-ACK codebook associated with the PDCCH;

transmitting, to the first TRP, the first HARQ-ACK codebook on the first PUCCH resource indicated by the DCI in the PDCCH; and transmitting, to the second TRP, the second HARQ-ACK codebook on the second PUCCH resource indicated by the DCI in the PDCCH.

2. The method of claim 1, further comprising:

in case that at least one symbol in a slot allocated to the first PUCCH resource overlaps with at least one symbol in a slot allocated to the second PUCCH resource, concatenating the first HARQ-ACK codebook and the second HARQ-ACK codebook;

transmitting, to the first TRP, a concatenated HARQ-ACK codebook on the first PUCCH resource; and transmitting, to the second TRP, the concatenated HARQ-ACK codebook on the second PUCCH resource.

3. The method of claim 1, further comprising:

receiving information associated with a Type-1 HARQ-ACK codebook from a base station, wherein each of the first HARQ-ACK codebook and the second HARQ-ACK codebook is identified as the Type-1 HARQ-ACK codebook based on the information associated with the Type-1 HARQ-ACK codebook.

4. The method of claim 1, wherein UE capability for multi beam simultaneous transmission is supported, and wherein a first PUCCH including the first HARQ-ACK codebook and a second PUCCH including the second HARQ-ACK codebook have different beams associated with different spatial relations.

5. A user equipment (UE) in a wireless communication system, the UE comprising:

a transceiver;

at least one processor communicatively coupled to the transceiver; and at least one memory communicatively coupled to the at least one processor, storing instructions executable by the at least one processor to cause the UE to:

receive, from a first transmit/receive point (TRP), downlink control information (DCI) in a physical downlink control channel (PDCCH), for a first physical downlink shared channel (PDSCH) and a second PDSCH, wherein the DCI is associated with the first TRP and a second TRP;

based on the DCI from the first TRP, determine a first physical uplink control channel (PUCCH) resource and a second PUCCH resource, determine whether symbol-level overlapping exists between the first PUCCH resource and the second PUCCH resource;

in case that at least one symbol in a slot allocated to the first PUCCH resource does not overlap with at least one symbol in a slot allocated to the second PUCCH resource, generate a first HARQ-ACK codebook and a second HARQ-ACK codebook associated with the PDCCH;

transmit, to the first TRP, the first HARQ-ACK codebook on the first PUCCH resource indicated by the DCI in the PDCCH; and transmit, to the second TRP, the second HARQ-ACK codebook on the second PUCCH resource indicated by the DCI in the PDCCH.

6. The UE of claim 5, wherein the instructions are further executable by the at least one processor to cause the UE to:

in case that at least one symbol in a slot allocated to the first PUCCH resource overlaps with at least one symbol in a slot allocated to the second PUCCH resource, concatenate the first HARQ-ACK codebook and the second HARQ-ACK codebook, transmit, to the first TRP, a concatenated HARQ-ACK codebook on the first PUCCH resource, and transmit, to the second TRP, the concatenated HARQ-ACK codebook on the second PUCCH resource.

7. The UE of claim 5, wherein the at least one processor is further configured to:

receive information associated with a Type-1 HARQ-ACK codebook from a base station, wherein each of the first HARQ-ACK codebook and the second HARQ-ACK codebook is identified as the Type-1 HARQ-ACK codebook based on the information associated with the Type-1 HARQ-ACK codebook.

8. The UE of claim 5, wherein UE capability for multi beam simultaneous transmission is supported, and wherein a first PUCCH including the first HARQ-ACK codebook and a second PUCCH including the second HARQ-ACK codebook have different beams associated with different spatial relations.

9. A method performed by a base station (BS) in a communication system, the method comprising:

transmitting, downlink control information (DCI), in a physical downlink control channel (PDCCH), for a first physical downlink shared channel (PDSCH) and a second PDSCH, wherein the DCI is associated with a first transmit/receive point (TRP) and a second TRP, and wherein based on the DCI, a first physical uplink control channel (PUCCH) resource and a second PUCCH resource are determined;

in case that at least one symbol in a slot allocated to the first PUCCH resource does not overlap with at least one symbol in a slot allocated to the second PUCCH resource, receiving a first HARQ-ACK codebook on the first PUCCH resource indicated by the DCI in the PDCCH; and receiving a second HARQ-ACK codebook on the second PUCCH resource indicated by the DCI in the PDCCH.

10. The method of claim 9, further comprising:

in case that at least one symbol in a slot allocated to the first PUCCH resource overlaps with at least one symbol in a slot allocated to the second PUCCH resource, receiving a concatenated HARQ-ACK codebook, wherein the concatenated HARQ-ACK codebook is defined by concatenating the first HARQ-ACK codebook and the second HARQ-ACK codebook.

11. The method of claim 9, further comprising:

transmitting information associated with a Type-1 HARQ-ACK codebook, wherein each of the first HARQ-ACK codebook and the second HARQ-ACK codebook is identified as the Type-1 HARQ-ACK codebook based on the information associated with the Type-1 HARQ-ACK codebook.

12. The method of claim 9, wherein UE capability for multi beam simultaneous transmission is supported, and wherein a first PUCCH including the first HARQ-ACK codebook and a second PUCCH including the second HARQ-ACK codebook have different beams associated with different spatial relations.

13. A base station (BS) in a wireless communication system, the BS comprising:

a transceiver; and at least one processor communicatively coupled to the transceiver; and at least one memory communicatively coupled to the at least one processor, storing instructions executable by the at least one processor to cause the BS to:

transmit, downlink control information (DCI), in a physical downlink control channel (PDCCH), for a first physical downlink shared channel (PDSCH) and a second PDSCH, wherein the DCI is associated with a first transmit/receive point (TRP) and a second TRP, and wherein based on the DCI, a first physical uplink control channel, PUCCH, resource and a second PUCCH resource are determined, in case that at least one symbol in a slot allocated to the first PUCCH resource does not overlap with at least one symbol in a slot allocated to the second PUCCH resource, receive a first HARQ-ACK codebook on the first PUCCH resource indicated by the DCI in the PDCCH, and receive a second HARQ-ACK codebook on the second PUCCH resource indicated by the DCI in the PDCCH.

14. The BS of claim 13, wherein the instructions are further executable by the at least one processor to cause the BS to:

in case that at least one symbol in a slot allocated to the first PUCCH resource overlaps with at least one symbol in a slot allocated to the second PUCCH resource, receive a concatenated HARQ-ACK codebook, wherein the concatenated HARQ-ACK codebook is defined by concatenating the first HARQ-ACK codebook and the second HARQ-ACK codebook.

15. The BS of claim 13, wherein the at least one processor is further configured to:

transmit information associated with a Type-1 HARQ-ACK codebook, wherein each of the first HARQ-ACK codebook and the second HARQ-ACK codebook is identified as the Type-1 HARQ-ACK codebook based on the information associated with the Type-1 HARQ-ACK codebook.

16. The BS of claim 13, wherein UE capability for multi beam simultaneous transmission is supported, and wherein a first PUCCH including the first HARQ-ACK codebook and a second PUCCH including the second HARQ-ACK codebook have different beams associated with different spatial relations.

* * * * *